(12) United States Patent
Higuchi et al.

(10) Patent No.: US 7,233,787 B2
(45) Date of Patent: Jun. 19, 2007

(54) DATA DISTRIBUTION TERMINAL, MENU SERVER, AND DISTRIBUTION RESERVATION SYSTEM USING THEM

(75) Inventors: Takeshi Higuchi, Gifu (JP); Yoshihiro Hori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 498 days.

(21) Appl. No.: 10/221,194

(22) PCT Filed: Mar. 26, 2001

(86) PCT No.: PCT/JP01/02431

§ 371 (c)(1),
(2), (4) Date: Sep. 23, 2002

(87) PCT Pub. No.: WO01/73569

PCT Pub. Date: Oct. 4, 2001

(65) Prior Publication Data

US 2003/0050050 A1 Mar. 13, 2003

(30) Foreign Application Priority Data

Mar. 27, 2000 (JP) .............................. 2000-86838

(51) Int. Cl.
*H04M 3/42* (2006.01)
*H04Q 7/32* (2006.01)
*H04B 1/38* (2006.01)

(52) U.S. Cl. ...................... 455/414; 455/412; 455/413; 455/154; 455/557; 455/572; 455/458; 455/566; 45/419; 45/422; 45/445

(58) Field of Classification Search ............. 455/154.1, 455/412, 413, 414, 154, 557, 572, 556, 458, 455/566, 419, 422, 445; 709/232, 226, 229
See application file for complete search history.

(56) References Cited

U.S. PATENT DOCUMENTS

| 6,047,327 | A  | * | 4/2000 | Tso et al. ................... 709/232 |
| 6,052,600 | A  | * | 4/2000 | Fette et al. ................. 455/509 |
| 6,366,792 | B1 | * | 4/2002 | Katsuki ...................... 455/572 |
| 6,510,515 | B1 | * | 1/2003 | Raith ......................... 713/163 |
| 6,725,022 | B1 | * | 4/2004 | Clayton et al. ........... 455/154.1 |
| 6,738,905 | B1 | * | 5/2004 | Kravitz et al. ............. 713/194 |
| 6,771,749 | B1 | * | 8/2004 | Bansal et al. ............ 379/88.17 |

FOREIGN PATENT DOCUMENTS

| JP | 10-097477 | 4/1998 |
| JP | 10-105295 | 4/1998 |
| JP | 10-105658 | 4/1998 |
| JP | 10-269754 | 10/1998 |
| JP | 11-284686 | 10/1999 |
| JP | 2000-32429 | 1/2000 |

* cited by examiner

*Primary Examiner*—Allan Hoosain
(74) *Attorney, Agent, or Firm*—Westerman, Hattori, Daniels & Adrian, LLP.

(57) ABSTRACT

A data delivery terminal (12) is connected to a delivery server (18) via a radio base station (14) and a cellular phone network (16). A user can input reservation information of content data (music data) by operating an operation panel on the data delivery terminal (12). For example, the reservation information includes a date and time of download and a title name of music data, connection information (DAP-TEL) to an access point (DAP) for a download server (20) and etc. When such the reservation information is input, the data delivery terminal (12) dials the access point in accordance with the date and time included in the reservation information. When a connection state is established, desired music data is transmitted from the download server (20) such that the music data is downloaded to a memory card attached to the data delivery terminal (12).

19 Claims, 15 Drawing Sheets

(B) 40

DOWNLOAD RESERVATION REGISTRATION

DOWNLOAD DATE AND TIME:

| YEAR | MONTH | DATE | HOUR | MINUTE |

TITLE NAME:          SIZE:
                                         MB

ARTIST NAME:       PURCHASE CONDITION:

SERVER ID:

( REGISTRATION ) ( CANCEL )

DATA DISTRIBUTION TERMINAL, MENU SERVER, AND DISTRIBUTION RESERVATION SYSTEM USING THEM

TECHNICAL FIELD

The present invention relates to a data delivery terminal, a menu server and a delivery reservation system utilizing them. More specifically, the present invention relates to a data delivery terminal, a menu server and a delivery reservation system utilizing them capable of downloading content data such as music data, image data and etc. via a cellular phone network.

PRIOR ART

Conventionally, a data delivery terminal of such a kind is a computer such as a personal computer (PC) which is connected to the Internet via a telephone line so as to access a predetermined homepage and download content data such as music data, image data and etc.

However, in the prior art, each time desired content data is downloaded, there is a need to access a predetermined home page and therefore, the operation is troublesome. Furthermore, as to the music data and the image data, a sale date of a new work is determined, and in a case of forgetting the sale date, there is a possibility that it is late to download them.

In addition, in a case of downloading such the music data utilizing a cellular phone, there is a problem that it is impossible to carry on a conversation in the middle of the download. For example, as to the music data compressed by an MPEG3 format, it takes about 4 minutes for downloading a piece of music by a PHS having a data transmitting/receiving rate of 128 Kbps while it takes about 8 minutes by a PHS having a data transmitting/receiving rate of 64 Kbps.

SUMMARY OF THE INVENTION

Therefore, it is a primary object of the present invention to provide a data delivery terminal, a menu server and a data reservation system utilizing them capable of surely downloading content data with a simple operation.

It is another object of the present invention to provide a data delivery terminal, a menu server and a data reservation system utilizing them capable of avoiding a non-telephonic condition.

The present invention is a data delivery terminal for downloading content data via a cellular phone network, comprising: a first input means for inputting reservation information including at least data identifying information of the content data; a second input means for inputting schedule information including a date and time of download in correspondence to the reservation information; a first storing means for storing the reservation information and the schedule information; an establishing means for automatically establishing connection with a delivery source which delivers the content data according to the schedule information and the reservation information; a download means for automatically downloading the content data when the connection is established by the establishing means; and a second storing means for storing downloaded content data.

The data delivery terminal of the present invention is connected to a download server, for example, via the cellular phone network and downloads desired content data from the download server. The first input means inputs the reservation information including the data identifying information indicative at least the desired content data, and the second input means inputs schedule information specifying the date and time to be downloaded in correspondence to the reservation information. The reservation information and the schedule information are stored in the first storing means. According to the reservation information and the schedule information stored in the first storing means, the establishing means automatically establishes a connection with the delivery source delivering the content data i.e., the download server. When the connection between the data delivery terminal and the download server is established, the download means automatically downloads the content data according to the data identifying information. The downloaded content data is stored in the second storing means. Thus, only by inputting the schedule information according to the reservation information, it is possible to download the desired content data at the reserved date and time.

According to the present invention, since only by inputting the reservation information of the content data in advance it is possible to download the content data at the reserved date and time, an operation is simple, and the download can be performed surely.

In another aspect of the present invention, a determining means determines whether the data delivery terminal is in a situation possible to download or a situation impossible to download at a time that the download is to be performed. More specifically, a radio wave condition between the data delivery terminal and a radio base station, a remaining amount of a battery of the data delivery terminal, a vacant capacity of the first storing means and etc. are examined.

In one embodiment of the present invention, in a case it is determined that it is impossible to perform the download, a renewal means renews the date and time to be downloaded. It is possible to exchange or charge the battery and reserve a vacant area by the renewed day.

In another embodiment of the present invention, in a case it is determined that it is impossible to perform the download, a warning means warns such a not-downloadable situation. That is, a warning sound is output or a warning message such as "LACK OF REMAINING AMOUNT OF BATTERY. EXCHANGE BATTERY" is displayed on a display screen. In response thereto, a user can make the data delivery terminal in a downloadable condition properly.

In another aspect of the present invention, since the reservation information further includes a downloadable term of the content data, the second input means may input a date and time to download the content data within the downloadable term.

In the other aspect of the present invention, the content data is music data and image data protected under copyright.

In one embodiment of the present invention, since the data delivery terminal is provided with a telephonic speech means, the user of the data delivery terminal carries on a conversation with the user of another communication device such as a cellular phone and etc. via a cellular phone network. Accordingly, if a date and time to be downloaded is specified within an office hour or bedtime hour, it is possible to avoid a situation that a telephonic speech cannot be performed.

In another embodiment of the present invention, since a first decryption means decrypts encrypted content data into plain text information, in a case of providing a reproduction circuit and etc., it is possible to reproduce music data by the data delivery terminal. In a case of image data, it is possible to display it on a display device such as a liquid crystal display and etc. provided on the data delivery terminal.

In the other aspect of the present invention, a second storing means is a memory card attached to or detached from the data delivery terminal. The memory card is provided with a first memory storing the encrypted content data and a second memory storing a content decryption key. A second decryption means decrypts data being subject to an encryption at another place so as to write it in the second memory. That is, decrypted data is written to the second memory. An encryption means encrypts the data read out from the second memory. That is, it is possible to solve a problem of security for protecting the content data protected under copyright.

Another invention is a data delivery terminal for downloading content data via a cellular phone network and storing the content data in an attachable/detachable storing device, comprising: an interface for transmitting and receiving at least the content data to and from the storing device when the storing device is attached; a first input means for inputting reservation information including data identifying information of at least the content data; a second input means for inputting schedule information including a date and time of download in correspondence to the reservation information; a storing means for storing the reservation information and the schedule information; an establishing means for automatically establishing connection with a delivery source which delivers the content data according to the schedule information and the reservation information; a download means for automatically downloading the content data when the connection is established by the establishing means; and a storage control means for storing downloaded content data in the storing means via the interface.

A data delivery terminal of another invention is connected with the download server, for example, via the cellular phone network and downloads desired content data from the download server so as to be stored in the storing device attachable to or detachable from the data delivery terminal. The data delivery terminal is provided with the interface, and the interface transmits and receives data such as at least content data and with the storing device when the storing device is attached to the data delivery terminal. Furthermore, in the data delivery terminal, the first input means inputs the data identifying information indicative of at least the content data, and the second input means inputs the schedule information for specifying the date and time of download in correspondence to the reservation information. The reservation information and the schedule information are stored in the storing means. According to the reservation information and the schedule information stored in the storing means, the establishing means automatically establishes the connection to the delivery source for delivering the content data i.e., the download server. When the connection between the data delivery terminal and the download server is established, the download means automatically downloads the content data according to the data identifying information. The downloaded content data is stored in the storing device attached to the data delivery terminal by the storage control means. Thus, only by inputting the schedule information according to the reservation information, it is possible to download desired content data on the reserved date and time.

According to the present invention, only by inputting the reservation information of the content data in advance, it is possible to download the desired content data on the reserved date and time, and therefore, it is possible to surely download it with a simple operation.

According to another aspect of the present invention, a determination means determines whether the data delivery terminal is in a situation possible to download or a situation impossible to download at a time that the download is to be performed. Specifically, a radio wave condition between the data delivery terminal and the radio base station, a remaining amount of the battery of the data delivery terminal, a vacant capacity of the first storing means and etc. are examined.

In one embodiment of the present invention, in a case it is determined that it is impossible to perform the download, a renewal means renews the date and time to be downloaded. It is possible to exchange or charge the battery and reserve a vacant area by the renewed date. Thus, it is possible to surely perform the download.

In another embodiment of the present invention, in a case it is determined that it is impossible to perform the download, a warning means warns such a not-downloadable situation. That is, a warning sound is output or a warning message such as "LACK OF REMAINING AMOUNT OF BATTERY EXCHANGE BATTERY" is displayed. In response, the user renders the data delivery terminal in a downloadable condition properly.

In another aspect of the present invention, since the reservation information further includes a downloadable term of the content data, the second input means may input a date and time for downloading the content data within the downloadable term.

Another invention is a menu server for transmitting reservation information for downloading content data to a data delivery terminal connected via a cellular phone network, comprising: a first holding means for holding a plurality of data identifying information corresponding to a plurality of content data; a receiving means for receiving at least input information input by the data delivery terminal; an identifying information selecting means for selecting one data identifying information according to the input information received by the receiving means; a reservation information creating means for creating the reservation information including the one data identifying information selected by the identifying information selecting means; and a transmitting means for transmitting the reservation information created by the reservation information creating means to the data delivery terminal.

The menu server transmits the reservation information for downloading the content data to the delivery terminal connected via the cellular phone network. For example, in the menu server, the first holding means holds the plurality of data identifying information such as IDs in correspondence to the plurality of content data. In the menu server, the receiving means receives the input information input at the data delivery terminal, and the identifying information selecting means selects one data identifying information according to the input information. Specifically, the input information includes information to indicate (specify) at leas the content data. When the one data identifying information is selected, the reservation information including the data identifying information is created. Then, the created reservation information is transmitted to the data delivery terminal by the transmitting means. For example, the data delivery terminal can download desired content data at the reserved date and time only by inputting the schedule information according to the reservation information.

According to the present invention, since the data delivery terminal can obtain the reservation information only by accessing the menu server and inputting the input information, there is no need to obtain the reservation information from magazines and etc. so as to be input, and therefore, it is possible to download the content data with ease.

In one aspect of the present invention, since a second holding means holds connection information to the delivery source of the content data, e.g., the download server, the identifying information selecting means selects one data identifying information from the input information and also selects the connection information to the download server capable of downloading the content data indicated by the data identifying information. Accordingly, the reservation information creating means creates the reservation information including the data identifying information and the connection information selected by the identifying information selecting means. In the data delivery terminal, it is possible to be connected to the download server according to the connection information at the reserved date and time, and thus to download the content data.

In another aspect of the present invention, a term information creating means creates term information indicative of the downloadable term of the content data, and the reservation information including the term information is created. Accordingly, in the data delivery terminal, it is determined whether or not the schedule information is set within the downloadable term (date and time) indicated by the term information.

A delivery reservation system according to another invention comprises: a data delivery terminal for downloading content data via a cellular phone network; and a menu server to be connected to the data delivery terminal via the cellular phone network; the menu server includes a first holding means for holding a plurality of data identifying information each corresponding to each of a plurality of content data; a receiving means for receiving an instruction from the data delivery terminal; an identifying information selecting means for selecting one data identifying information according to the instruction from the data delivery terminal; a reservation information creating means for creating reservation information from the one data identifying information selected by the identifying information selecting means; and a transmitting means for transmitting created reservation information to the data delivery terminal.

The delivery reservation system of this invention includes the data delivery terminal downloading content data via the cellular phone network and the menu server connected to the data delivery terminal via the cellular phone network. The menu server includes the first holding means, and the first holding means holds the plurality of data identifying information in correspondence to the plurality of content data, respectively. Accordingly, when receiving an instruction from the data delivery terminal, the identifying information selecting means selects according to the instruction the one identifying information from the plurality of data identifying information held in the first holding means. Thereupon, the reservation information creating means creates the reservation information based on the selected data identifying information. The reservation information thus created is transmitted to the data delivery terminal by a transmitting means. That is, the data delivery terminal can store (register) the transmitted reservation information in a first storing means.

According to the present invention, the reservation information is applied from the menu server, and therefore, it is possible to further simplify the operation.

In one aspect of the present invention, the reservation information includes connection information for connecting the data delivery terminal to a connecting destination i.e., a download server, and the connection information is stored in a second holding means. Since the identifying information selecting means also selects the connection information corresponding to the data identifying information, the reservation information creating means creates the reservation information including the data identifying information and the connection information. Accordingly, the data delivery terminal can easily connect to the download server according to the connection information and download the content data.

In another aspect of the present invention, since the reservation information includes a downloadable term, the data delivery terminal can determine based on the term whether or not schedule information is set at a downloadable date and time.

BEST MODE FOR EMBODYING THE INVENTION

Figure 1:
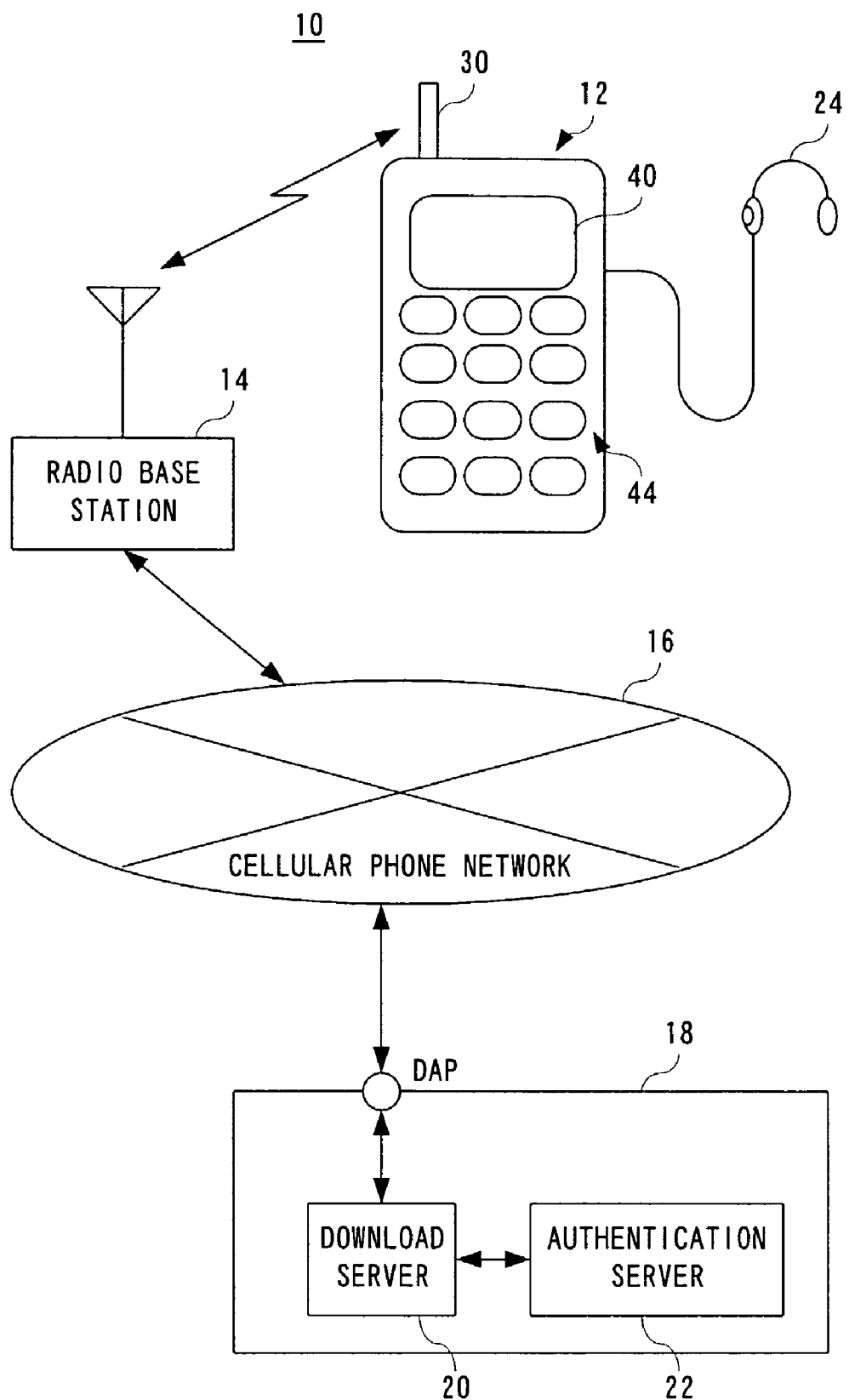
FIG. 1 is an illustrative view showing one embodiment of the present invention.

Referring to FIG. 1, a download system 10 of this embodiment includes a cellular phone 12 which is connected to a delivery server 18 through a radio base station 14 and a cellular phone network 16. The delivery server 18 includes a download server 20 and an authentication server 22 which are coupled to each other for mutual communications.

Figure 2:
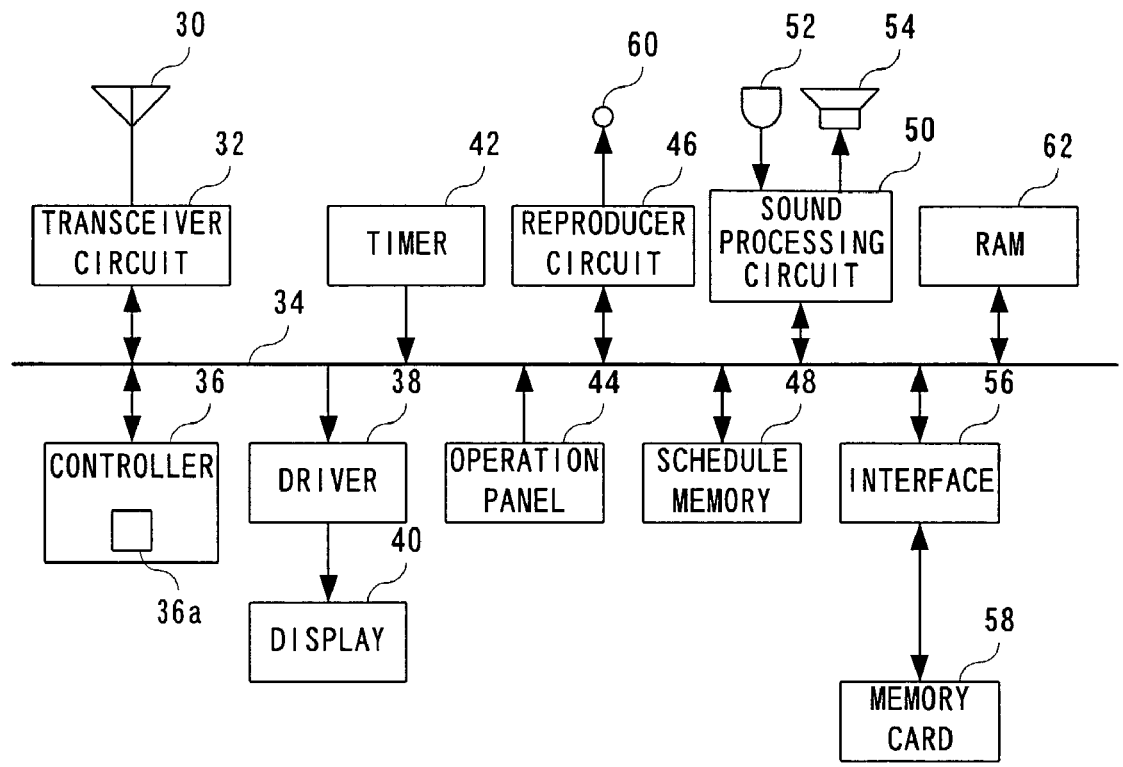
FIG. 2 is an illustrative view showing a configuration of a cellular phone of FIG. 1 embodiment.

Referring to FIG. 2, the cellular phone 12 includes an antenna 30 which is coupled to a transceiver circuit 32. The transceiver circuit 32 is coupled to a controller 36 via an internal bus (herein after merely referred to as "bus") 34. The controller 36 executes a call receiving process in response to an incoming call from an opposite side of communication. That is, the controller 36 controls a sound processing circuit 50 and outputs a calling tone or melody through a speaker 54. A user recognizes "presence of incoming call" due to the calling tone or melody so that he or she can input a call receiving operation by use of an operation panel 44. As a consequence, a state of connection is established to allow the controller 36 to execute a speech process. Specifically, a voice signal from the opposite side of communication is received at the antenna 30 and fetched in the controller 36 through the transceiver circuit 32, and then output from the speaker 54 through the bus 34 and the sound processing circuit 50. On the other hand, a user-voice signal is input at a microphone 52 and fetched in the controller 36 through the sound processing circuit 50 and the bus 34, and then transmitted from the antenna 30 through the bus 34 and the transceiver circuit 32.

Furthermore, the user can input a telephone number of a desired opposite side of communication by use of the operation panel 44. When the user inputs the telephone number, in response thereto, the controller 36 controls a driver 38 so as to display the telephone number on the display 40. Succeedingly, if the user instructs to call by use of the operation panel 44, the controller 36 executes a calling operation. Then, if establishing a connection state to the opposite side of communication, the controller 36 executes a speech process as described above.

The cellular phone 12 also includes a timer 42. Based upon time information output from the timer 42, the controller 36 controls the driver 38 to display a calendar (date), time and the like on the display 40. Furthermore, when the user instructs to display a schedule by operating the operation panel 44, the controller 36 controls the driver 38 and displays a screen of the schedule (schedule screen) on the display 40.

When the schedule screen is displayed, the user can input a schedule and etc. thereto by use of the operation panel 44. When the schedule and etc. is input, the controller 36 stores (registers) information such as the schedule and etc. in a schedule memory 48. Accordingly, when a schedule display is instructed thereafter, the controller 36 reads out the information of the schedule and etc. from the schedule memory 48, and allows the display 40 to display the information including the schedule and etc. by controlling the driver 38.

The cellular phone 12 further includes a reproducer circuit 46 and an interface 56. The reproducer circuit 46 and the interface 56 are coupled to the controller 36 through the bus 34. The reproducer circuit 46 is connected with a terminal 60 to which a headphone 24 is connected as shown in FIG. 1.

Also, the interface 56 is connected with a memory card 58 that is to be detachably attached to a phone main body. Accordingly, when the user instructs reproduction by use of the operation panel 44, in response thereto, the controller 36 executes a reproduction process. That is, music data stored in the memory card 58 is read out. The reproducer circuit 46 reproduces this data so as to output to the headphone 24 through the terminal 60.

Figure 3:
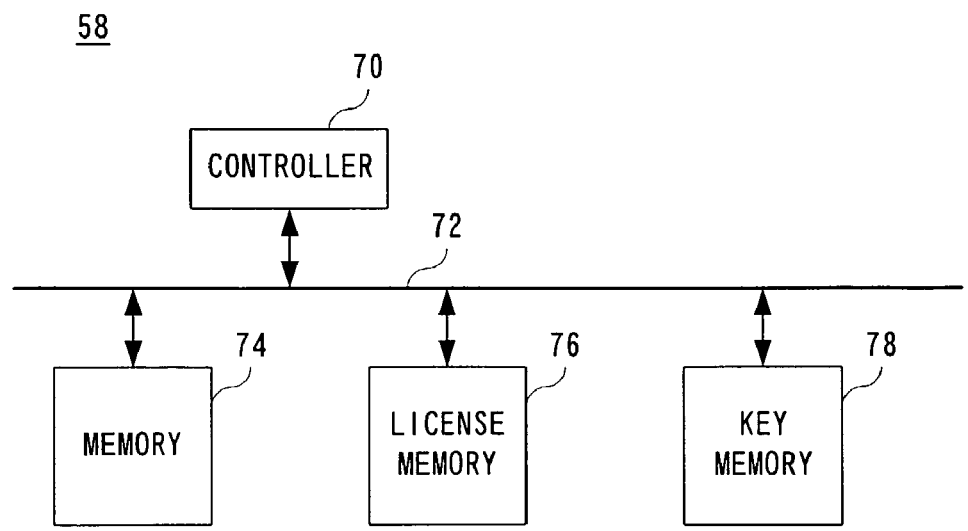
FIG. 3 is an illustrative view showing a configuration of a memory card shown in FIG. 2.

As shown in FIG. 3, the memory card 58 includes a controller 70. The controller 70 is coupled through a bus 72 to a memory 74, a license memory 76 and a key memory 78. The memory 74 stores data obtained by encrypting data such as music data and etc. protected under copyright (content data), and data to be freely exchanged. Also, the license memory 76 stores data such as a content decryption key and etc. required to protect a copyright, that is, license data required to reproduce the encrypted content data. Furthermore, the key memory 78 stores a key for use in a mutual authentication (encryption) process to be conducted in transmitting/receiving the license data.

Figure 4:
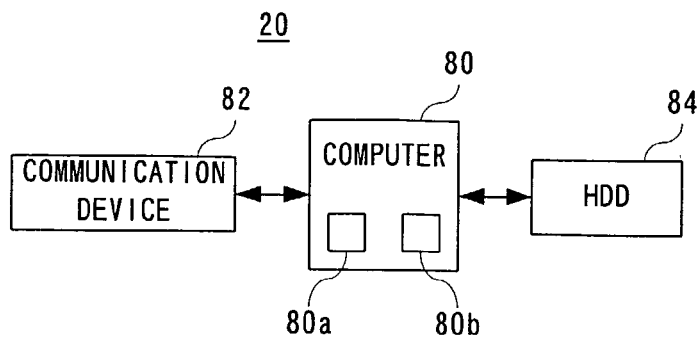
FIG. 4 is an illustrative view showing a configuration of a download server shown in FIG. 1 embodiment.

Referring to FIG. 4, the download server 20 includes a computer 80. The computer 80 is coupled to a communication device 82 and an HDD (Hard Disk Drive) 84. The communication device 82 can establish a connection with the cellular phone 12 via the cellular phone network 16 and the radio base station 14 in accordance with an instruction of a CPU 80a provided on the computer 80. Furthermore, the HDD 84 is stored with a plurality of encrypted music data and license keys each corresponding to each of the music data. Desired encrypted music data and the corresponding license key are read out in accordance with an instruction of the CPU 80a so as to be transmitted to the cellular phone 12 through the communication device 82. That is, the cellular phone 12 accesses the download server 20 via the radio base station 14 and the cellular phone network 16, and therefore, the desired music data can be downloaded.

Figure 5:
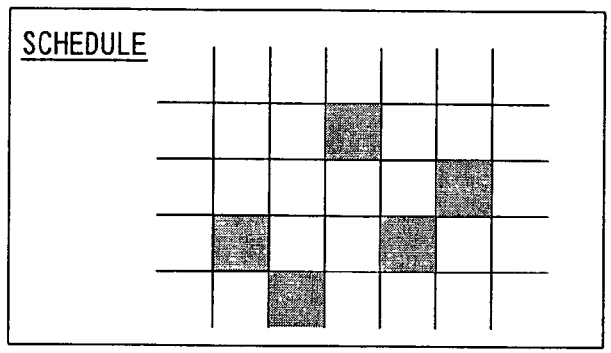
FIG. 5 is an illustrative view showing a schedule screen and a download reservation registration screen displayed on a display of the cellular phone of FIG. 1 embodiment.

For example, if the user instructs to display the schedule screen by utilizing the operation panel 44, the schedule screen as shown in FIG. 5(A) is displayed on the display 40. It is noted that although numerals of year, month, day and etc. are omitted for the sake of convenience of a drawing, the display 40 is displayed with a calendar, for example. In a case that the information such as a schedule is registered, the schedule is displayed in a simple letter, figure or the like on a corresponding day.

In addition, when the user operates a reservation button (not shown) provided on the control panel 44, in response thereto, the controller 36 controls the driver 38 so as to display a reservation registration screen (herein after merely referred to as "reservation screen") for downloading music data on the display 40. That is, a new reservation screen as shown in FIG. 5(B) is displayed. It is noted that although the screens of the display 40 shown in FIG. 5(A) and FIG. 5(B) are different in size for the sake of simplicity of a drawing, both of them are the same in size.

The user can input reservation information of music data desired to download on the basis of information obtained by a magazine and etc. on the reservation screen by use of the operation panel 44. As understood from FIG. 5(B), a date and time of download, a title name of the music data, and an artist name can be input on the reservation screen. Furthermore, a data size of the music data, a purchase condition and a server ID can also be input. Herein, the purchase condition is a condition whether or not the number of reproduction times of the downloaded music data is limited, and etc. The server ID means a telephone number (DAP-TEL) to an access point (DAP) for accessing the download server 20 shown in FIG. 1, a URL for properly accessing the download server 20, and etc.

It is noted that although the title or the artist name is input for designating the music data in this embodiment, a code (content ID) for identifying the music data may be input. The content ID can be obtained from the magazine and etc. in advance.

After completion of inputting such the reservation information, the user presses (clicks) the "REGISTRATION" button on the reservation screen by use of the operation panel 44. Thereupon, the controller 36 stores the input reservation information into the schedule memory 48. It is noted that in a case that the reservation information is not input at all, a warning message such as "NO INFORMATION IS INPUT", for example, is displayed on the reservation screen of the display 40 and a warning sound is output from the speaker 54. In response to the warning, after inputting the lacked reservation information, the user depresses the "REGISTRATION" button again.

It is noted that when a "CANCEL" button is depressed at a time of or after the completion of inputting the reservation information, the input (reservation) can be ended at an uncompleted state. That is, it is possible to stop the reservation in the middle.

Furthermore, after the reservation information is registered, when the schedule screen is displayed on the display 40 again, a simple character or figure and etc. indicative of presence of the reservation is displayed on the corresponding date (day of executing the download). It is noted that a portion indicative of the presence of the reservation is filled in FIG. 5(A). In the schedule screen the filled portion (column) is depressed, the controller 36 reads out corresponding reservation information from the schedule memory 48 and displays the corresponding reservation screen on the display 40. Accordingly, the user can confirm and correct the contents of the registration viewing the reservation screen. It is noted that after completion of confirmation and correction, when the "REGISTRATION" button is depressed, the reservation information is stored (rewritten) into the schedule memory 48. On the other hand, the "CANCEL" button is depressed, the controller 36 erases corresponding reservation information within the schedule memory 48. That is, the reservation can be canceled.

Figure 6:
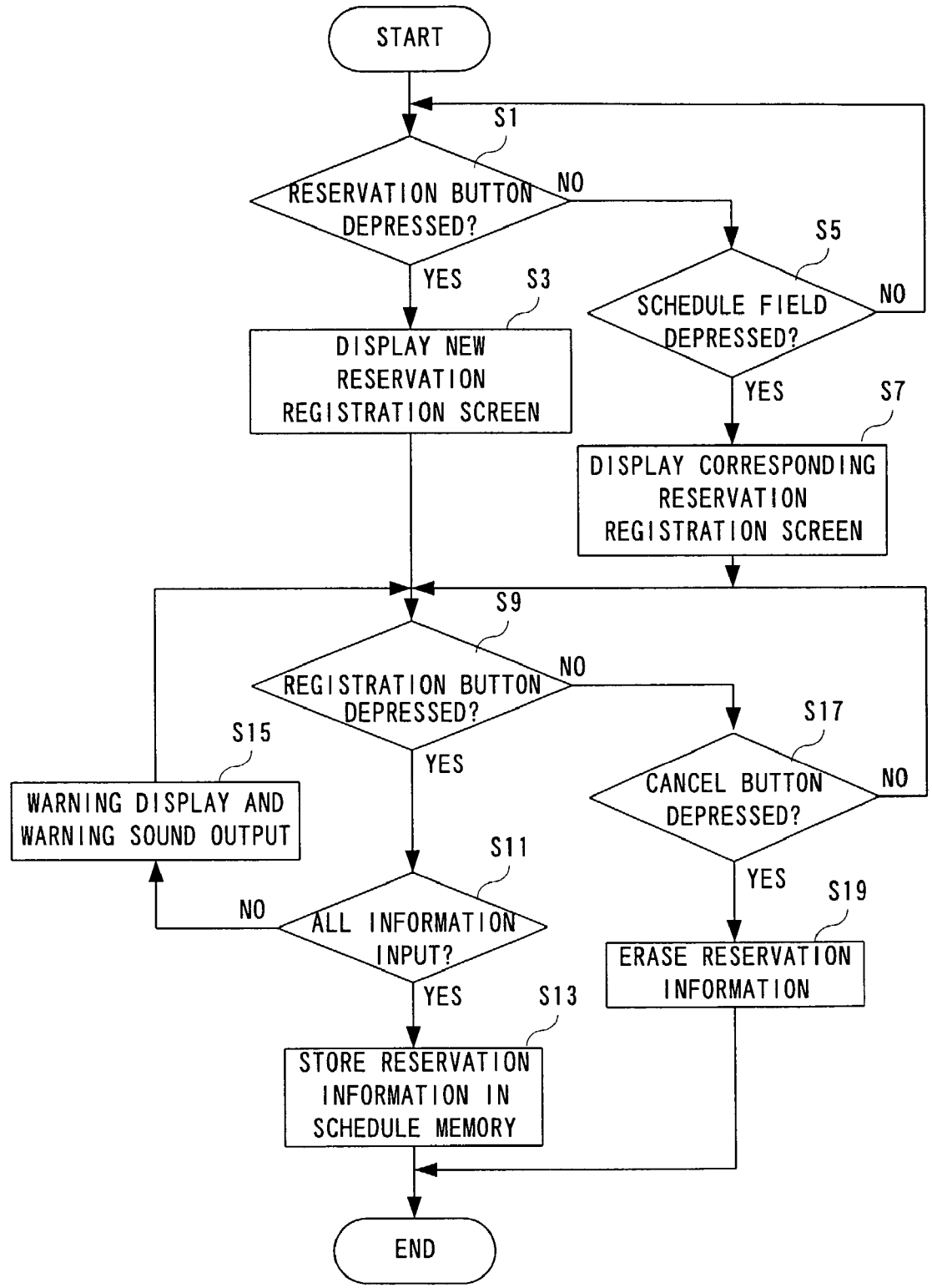
FIG. 6 is a flowchart showing a reservation registration process of a controller 36 shown in FIG. 2.

More specifically, the controller 36 performs a reservation process according to a flowchart shown in FIG. 6. The controller 36 starts a process when the main power of the cellular phone 12 is turned on, and it is determined whether or not the reservation button provided on the operation panel 44 is depressed in a step S1. If "YES" is determined in the step S1, i.e., if the reservation button is depressed, a new reservation screen is displayed on the display 40 by controlling the driver 38 in a step S3, and then, the process proceeds to a step S9.

On the other hand, if "NO" is determined in the step S1, it is determined whether or not a schedule column (a portion having a reservation on the schedule screen) is depressed in a step S5. That is, it is determined whether or not an instruction of displaying a reservation screen which has been registered is input. If "NO" is determined in the step S5 i.e., if the schedule column is not pointed, the process directly returns to the step S1. However, if "YES" is determined in the step S5 i.e., if the schedule column is depressed, corresponding reservation information is read from the schedule memory 48 and the reservation screen is displayed on the display 40 by controlling the driver 38. Then, the process proceeds to the step S9.

It is determined whether or not the "REGISTRATION" button on the reservation screen is depressed in the step S9. That is, it is determined whether or not an input of the reservation information on the reservation screen is ended. It is noted that in a case the displayed reservation information once reserved is displayed in a step S7, it is determined whether or not confirmation and correction are completed. If "YES" is determined in the step S9 i.e., if the "REGISTRATION" button is depressed, it is determined the input (confirmation) is ended, and then, it is determined whether or not all the reservation information is input in a step S11. If "NO" in the step S11 i.e., if all the reservation information has not been input, the warning message and the warning sound are output in a step S15, and then, the process returns to the step S9. More specifically, the controller 36 displays a message such as "INPUT ALL INFORMATION" and etc. on the display 40 by controlling the driver 38 and outputs the warning sound such as "PEE" and etc. from the speaker 54 by controlling the sound processing circuit 50. On the other hand, if "YES" in the step S11 i.e., if all the reservation information is input, the reservation information is stored in the schedule memory 48 in a step S13, and then, the process is ended.

Furthermore, if "NO" in the step S9 i.e., if the "REGISTRATION" button is not depressed, it is determined whether or not the "CANCEL" button is depressed in a step S17. If "NO" in the step S17 i.e., if the "CANCEL" button is not depressed, it is determined to be at a time of inputting, the process returns to the step S9. On the other hand, if "YES" in the step S17 i.e., if the "CANCEL" button is depressed, the corresponding reservation information within the schedule memory 48 is erased in a step S19, and then, the process is ended. It is noted that in a case the "CANCEL" button is depressed on a new reservation screen, the input of the reservation information i.e., the reservation is ended in the middle.

Thus, it is possible to make a reservation to download desired music data. The controller 36 checks the schedule memory 48 at a predetermined set time (e.g., 9 a.m.) every day and determines whether or not a reservation is present on the day. The controller 36 obtains a time (reservation time) included in the reservation information in a case of present of reservation, and stores it in the memory 36*a* within the controller 36. The controller 36 detects time information applied from the timer 42, and executes a process for download at the time stored in the memory 36*a*.

Figure 7:
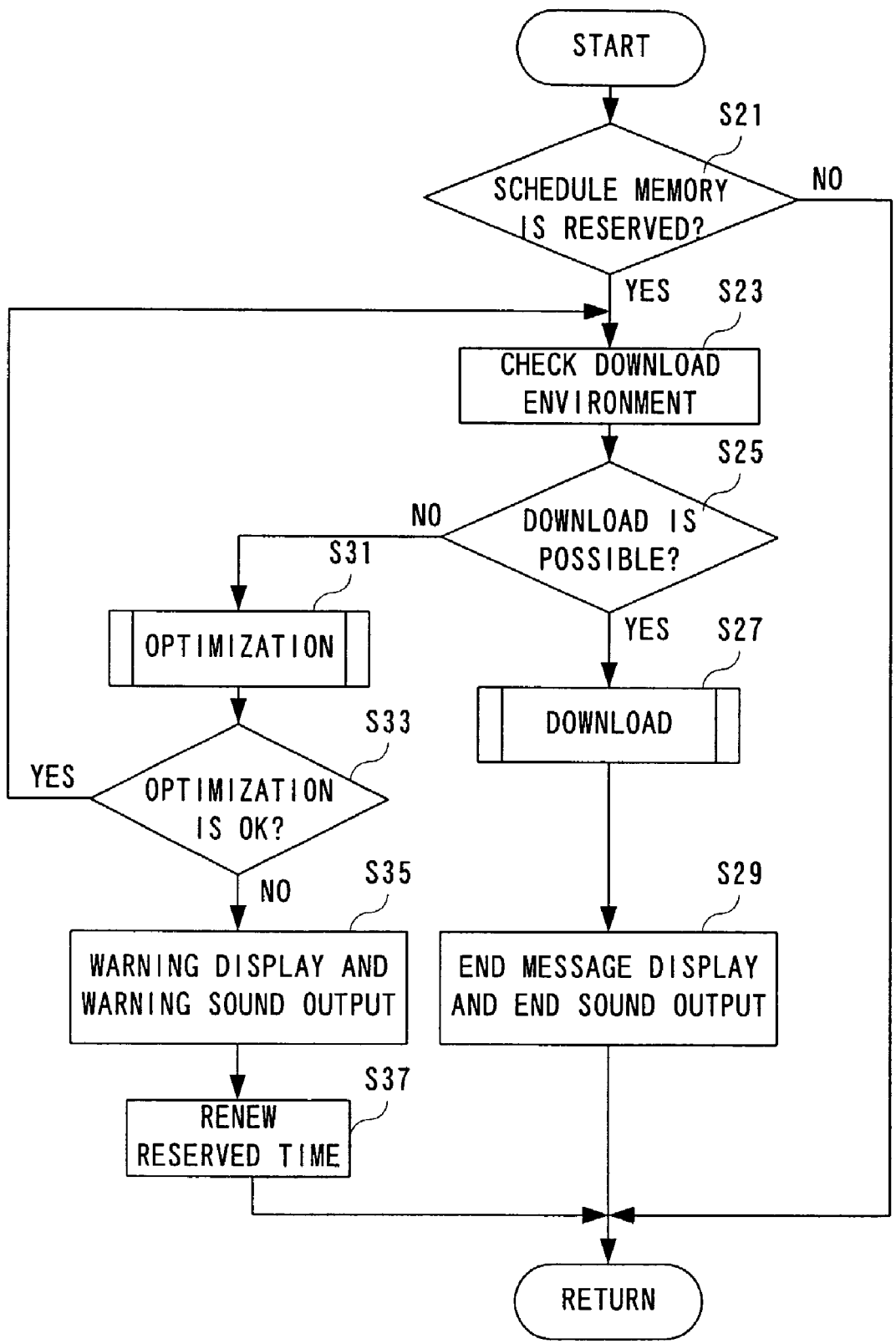
FIG. 7 is a flowchart showing a download process of the controller 36 shown in FIG. 2.
Figure 8:
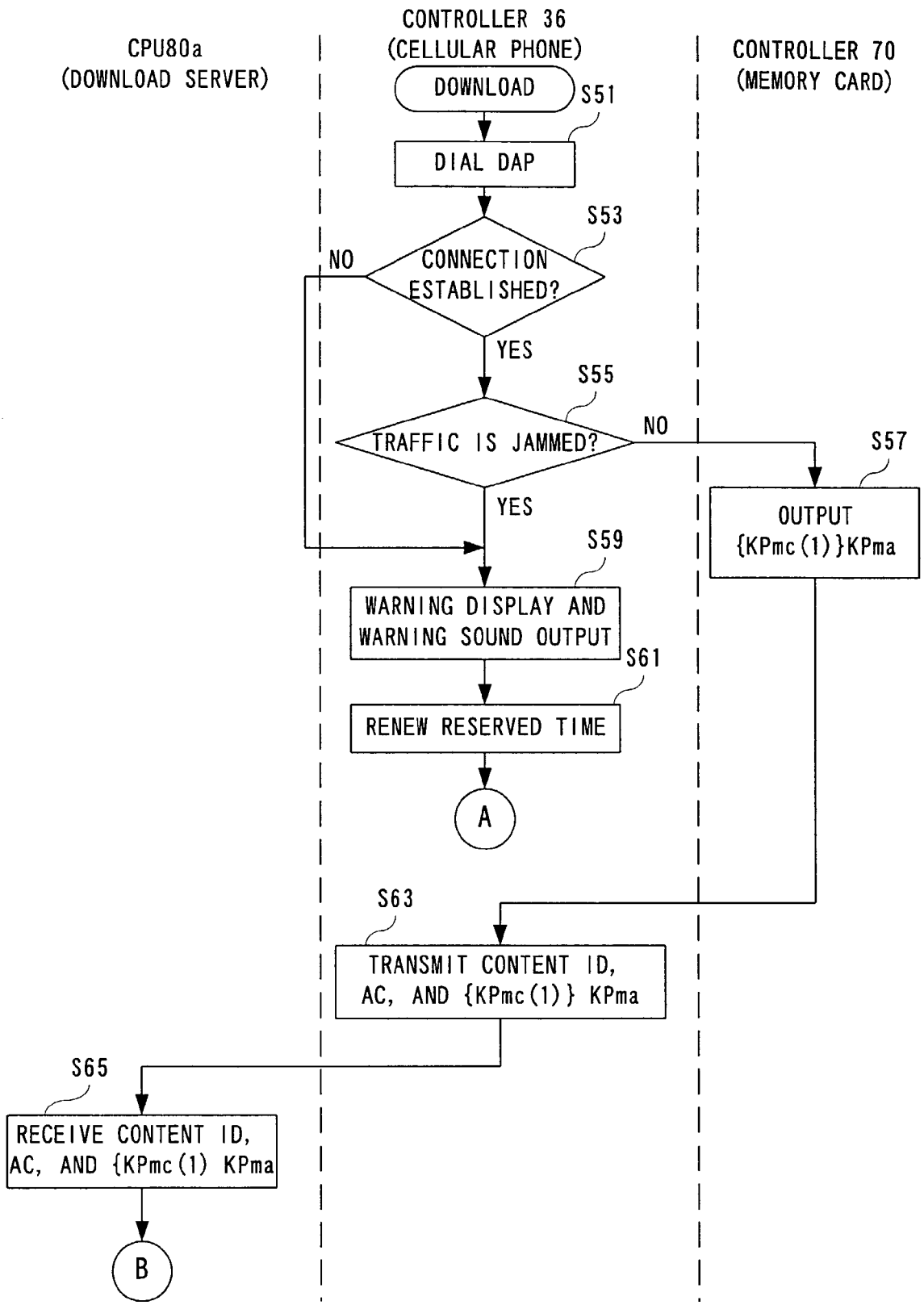
FIG. 8 is a flowchart showing a part of a process of the controller 36, a controller 70 and a CPU 80a in a case of actually downloading content data to the memory card from the download server of FIG. 1 embodiment.

More specifically, the controller 36 executes a process for download according to a flowchart shown in FIG. 7. The controller 36 starts the process at the reserved time as described above, and determines whether or not the reservation information is present in the schedule memory 48 in a step S21. That is, it is determined whether or not the reservation is present. It is noted that since the controller 36 starts the process for download on the basis of the reserved time once it obtains the reserved time, it is determined whether or not the reservation is present in the step S21 in preparation to a case that the user cancels the reservation after obtaining the reserved time.

If "NO" in the step S21, it is determined that no reservation is made, and the process is directly returned. If "YES" in the step S21 i.e., if the reservation is made, a download environment (situation) is checked in a step S23. More specifically, a radio wave condition, a vacant capacity of the license memory 76 within the memory card 58 and a remaining amount of a battery are checked.

The radio wave condition can be detected by an intensity of the radio wave. In the cellular phone 12, an intensity of the radio wave is detected in the transceiver circuit 32, and the controller 36 controls the driver 38 on the basis of the detected result so as to display an antenna character and a character indicative of an intensity level. Accordingly, if a threshold value of the intensity of the radio wave for determining whether a downloadable condition or not is evaluated by an experiment in advance and stored in the memory, it is possible to check (determine) the radio wave condition depending on whether or not the intensity of the radio wave is larger than the threshold value.

Furthermore, the vacant capacities of the memory 74 and the license memory 76 can be informed by communicating with the controller 70 provided on the memory card 58. Accordingly, it is possible to check (determine) whether or not the vacant capacity of the license memory 76 is sufficient by comparing the size (data size) of the music data included in the reservation information with the vacant capacity.

In addition, the remaining amount of the battery is easily checked (determined) by detecting a voltage value of the battery (not shown) and based on a characteristic of the battery. It is noted that the characteristic of the battery can be informed in advance by obtaining it through an experiment or from a manufacturer beforehand.

After completing all of the checks, the controller 36 determined whether or not the download is possible in a step S25. That is, it is determined whether or not the radio wave condition, the vacant capacity and the remaining amount of the battery all satisfy a downloadable condition. If "YES" in the step S25 i.e., if all conditions are satisfied, a download process is executed in a step S27, and a message and a sound for notifying the completion of the download are output in a step S29 and then, the process is returned.

On the other hand, if "NO" in the step S25 i.e., if at least one condition is not satisfied, an optimization process is executed in a step S31.

Only an improvement of the radio wave condition is executed in the optimization process for the purpose of simple description in this embodiment. Specifically, the controller 36 searches for another radio base station being strong in the intensity of the radio wave by controlling the transceiver 32. It is noted that the vacant capacity may be automatically increased in the optimization process. That is, the music data which has stored in the license memory 76 and became irreproducible, the music data having older downloaded date, or the music data low in reproduction frequency may be erased.

In a following step S33, it is determined whether or not the optimization process is ended, that is, whether the radio wave condition is improved or not. If "YES" in the step S33, the process returns to the step S23 so as to check the download environment again. On the other hand, if "NO" in the step S33 i.e., if in a case the radio wave condition is not improved, or a shortage of memory area or/and a shortage of the remaining amount of the battery occur, a warning display is performed as to an item that the downloadable condition is not satisfied, and the warning sound is output in a step S35.

For example, in a case the radio wave condition is not improved, "CANNOT DOWNLOAD DUE TO WORSE RADIO WAVE CONDITION" and etc. is displayed. In a case of insufficient memory area, a message such as "LACK OF VACANT AREA", "DELETE UNNECESSARY DATA OR EXCHANGE MEMORY CARD" and etc. is displayed. In a case of being short of the remaining amount of the battery, a message such as "LACK OF REMAINING AMOUNT OF BATTERY", "EXCHANGE OR CHARGE BATTERY" and etc. is displayed.

In a following step S37, the controller 36 renews the reserved time within the memory 36a and the reserved time included in the reservation information within the schedule memory 48. That is, the reserved time is delayed by a predetermined time period (i.e., 1 hour), and then the process is returned.

Although in a case impossible to perform the download, the time information is thus automatically renewed, the reservation screen may be displayed on the display 40 so as to allow the user to manually change the time information (reserved time).

The download process shown in the above described step S27 is shown in flowcharts shown in FIG. 8 to FIG. 11. In a case of downloading such the music data protected under copyright, there is a need to pay copyright royalty for an owner of the copyright. In addition, there is a problem that free exchange of the music data after download causes lack of the protection of the copyright. For avoiding such problems, a download process of the music data will be described on the basis of a process shown in detail in Japanese Patent Application No. 11-345229 previously filed by the applicant.

Such the download process is executed by mutually communicating the controller 70 within the memory card 58 and the CPU 80a within the download server 20. Thus, dot-lined partitioning is provided to facilitate understanding of the respective processes of the controller 36, the controller 70 and the CPU 80a.

When the download process is started, first, the controller 36 calls the download server 20 of a download destination in a step S51. That is, a server ID included in reservation information or connection information (DAP-TEL) to an access point (DAP) is dialed. Succeedingly, the controller 36 determines whether or not connection is established in a step S53. If "NO" is determined in the step S53 i.e., if the connection is not established, it is determined that it is impossible to perform the download, and then, the process proceeds to a step S59. On the other hand, if "YES" is determined in the step S53, it is determined whether or not traffic is jammed in a step S55. If "YES" is determined in the step S55 i.e., if the traffic is jammed, it is determined it is impossible to perform the download, and the process proceeds to the step S59.

Figure 11:
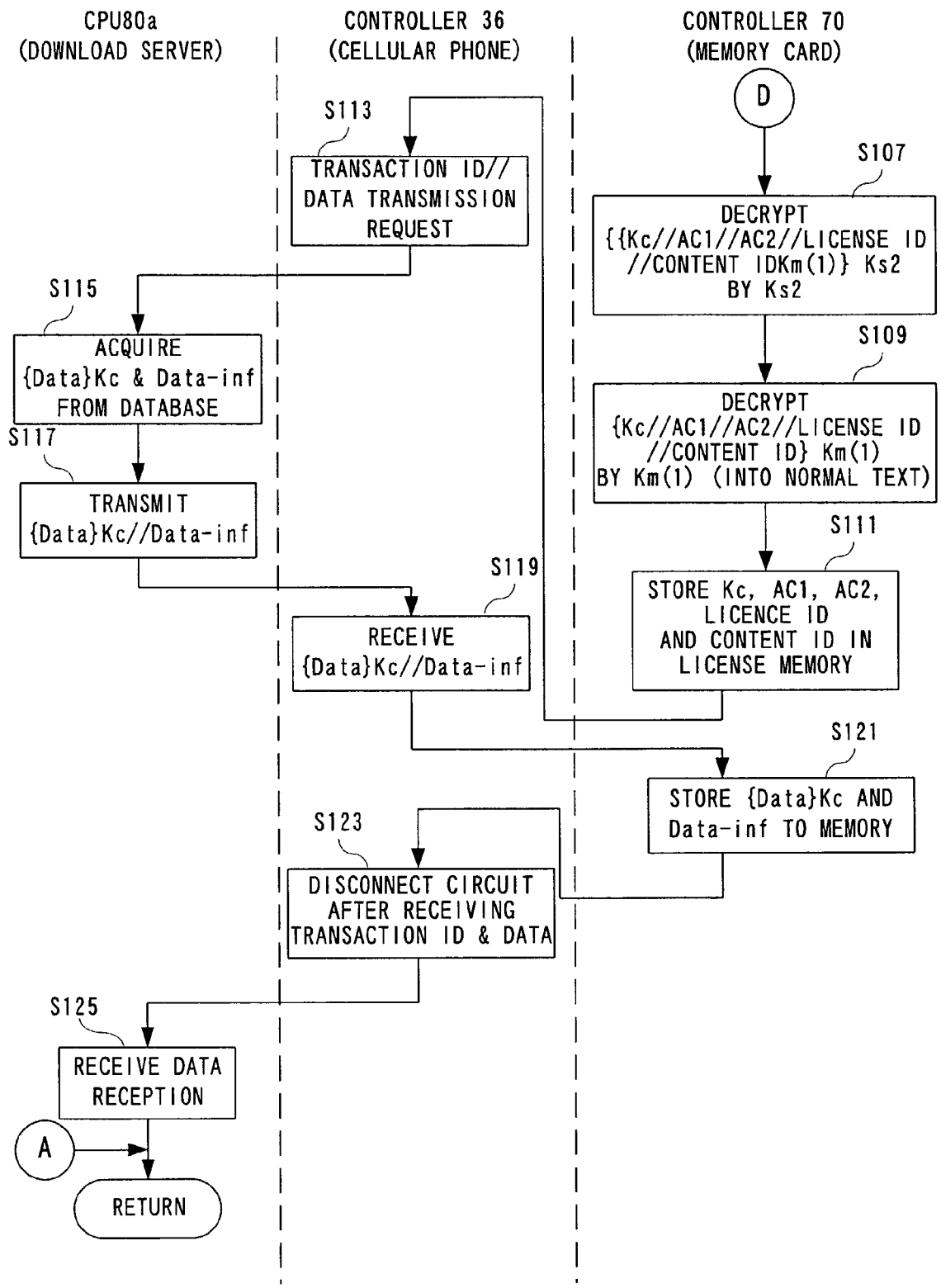
FIG. 11 is a flowchart showing a further part of the process of the controller 36, the controller 70 and the CPU 80a in a case of actually downloading the content data to the memory card from the download server of FIG. 1 embodiment.

In the step S59, the controller 36 displays the warning message on the display 40 by controlling the driver 38 and outputs the warning sound by controlling the sound processing circuit 50. That is, warning sound such as "PEE" or the like is output together with a message such as "CANNOT DOWNLOAD". In a following step S61, the controller 36 renews the reserved time within the memory 36a and the reserved time within a schedule memory 48 and then, the process is returned as shown in FIG. 11. It is noted that the reserved time is delayed by a predetermined time period (e.g., 15 minutes) in this embodiment. Furthermore, the user may change the reserved time as above-described manner.

On the other hand, if "NO" in the step S55 i.e., if the traffic is not jammed, first, the controller 70 outputs a certified public encryption key ({KPmc(1)}KPma) in a step S57. Note that the certified public encryption key ({KPmc(1)}KPma) is stored within the key memory 78 not directly accessible by a user and etc. Also, the public encryption key (KPmc(1)) is a public encryption key unique to a media class (kind, production lot and etc.) of the memory card 58.

In a following step S63, the controller 36 transmits the content ID, AC and the certified public encryption key ({KPmc(1)}KPma). Herein, the content ID is a code for identifying the music data (content data) and uniquely determined by a title name and an artist name included in the reservation information. Furthermore, the AC is license request information by which the reproduction condition of the music data is determined.

Figure 9:
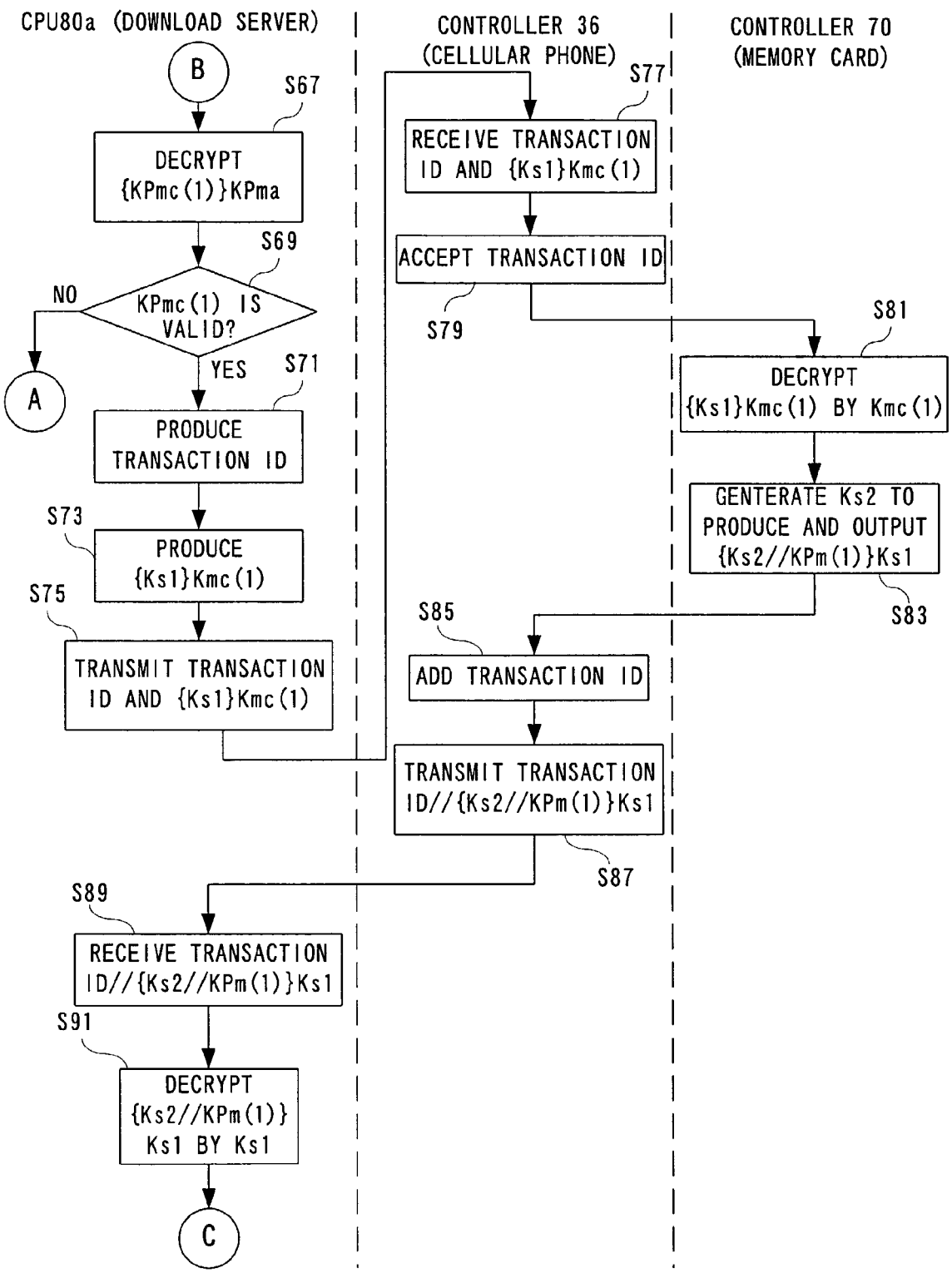
FIG. 9 is a flowchart showing another part of the process of the controller 36, the controller 70 and the CPU 80a in a case of actually downloading the content data to the memory card from the download server of FIG. 1 embodiment.
Figure 10:
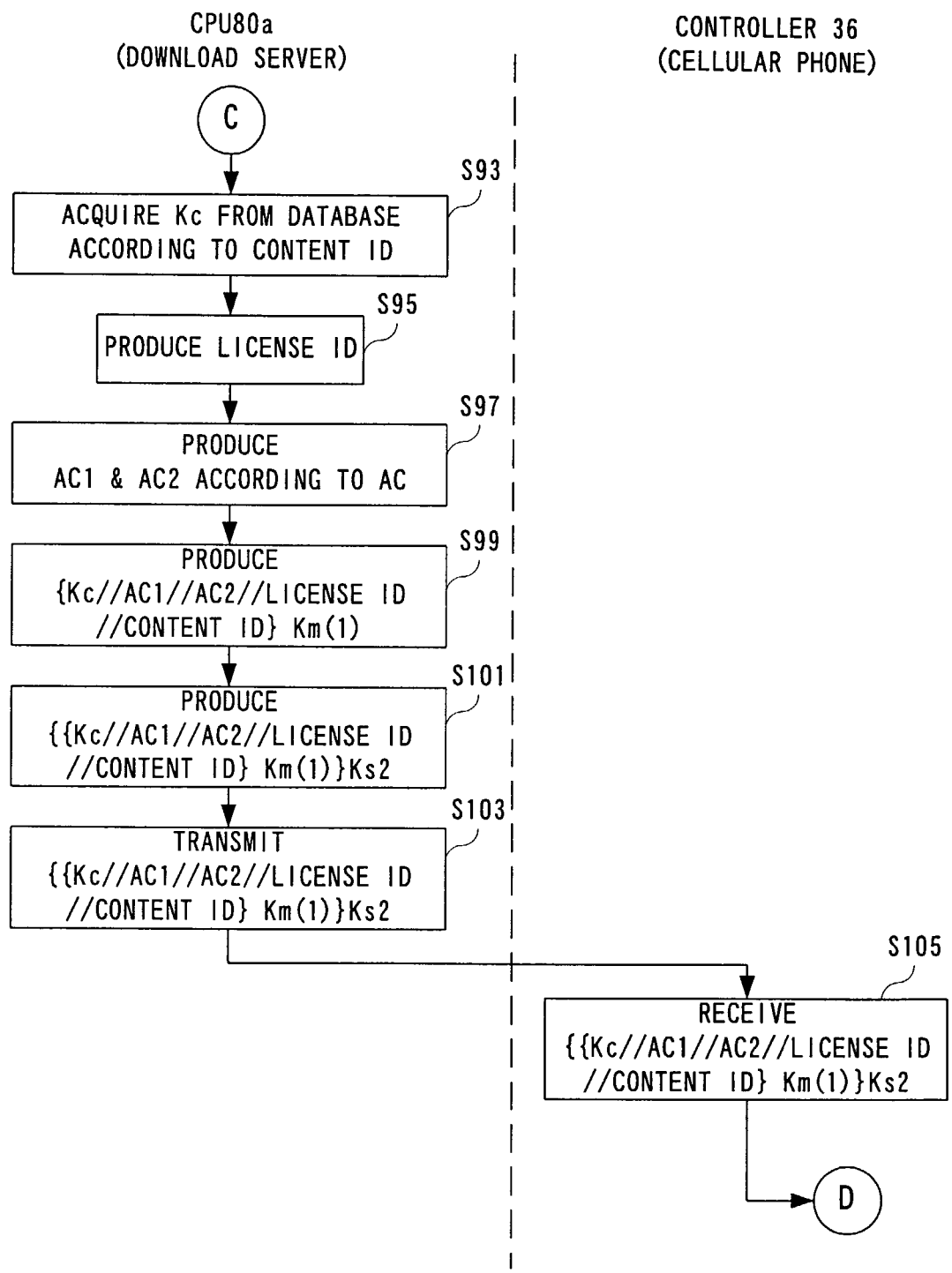
FIG. 10 is a flowchart showing the other part of the process of the controller 36, the controller 70 and the CPU 80a in a case of actually downloading the content data to the memory card from the download server of FIG. 1 embodiment.

In a following step S65, the CPU 80a receives the content ID, the AC and the certified public encryption key ({KPmc(1)}KPma), and decrypts the certified public encryption key ({KPmc(1)}KPma) using the RAM 80b as a working memory in a step S67 shown in FIG. 9. Noted that the download server 20 previously holds within the computer 80 a public key (authentication key: KPma) to decrypt the certified public encryption key ({KPmc(1)}KPma). Using the authentication key (KPma), the certified public encryption key ({KPmc(1)}KPma) is decrypted. Also, the expression {X}Y means information of X encrypted in a decryptable form by a key Y. This is true hereunder throughout the specification.

In a following step S69, it is determined whether or not the public encryption key (KPmc(1)) contained in the received certified public encryption key ({KPmc(1)}KPma) is valid or not from a result of the decryption. At this time, the CPU 80a makes an inquiry to the authentication server 22 to thereby examine whether the public encryption key (KPmc(1)) is valid or not.

If "NO" in the step S69 i.e., if the public encryption key (KPmc(1)) is invalid, the process is returned as it is as shown in FIG. 11. On the other hand, if "YES" in the step S69 i.e., if the public encryption key (KPmc(1)) is valid, the CPU 80a uses the RAM 80b to produce a code (transaction ID) capable of specifying a delivery session. Subsequently, the CPU 80a produces a symmetric key (Ks1) unique to this session by use of the RAM 80b, and performs encryption in a decryptable form with a private decryption key (Kmc(1)), which is asymmetric and unique to a media class of a memory card 58 by use of the public encryption key (KPmc(1)). That is, {Ks1}Kmc(1) is produced. Then, the CPU 80a transmits the transaction ID previously produced and the {Ks1}Kmc(1).

In a following step S77, the controller 36 receives the transaction ID and the {Ks1}Kmc(1), and accepts only the transaction ID in a step S79 and transmits the {Ks1}Kmc(1) as it is to the controller 70 of the memory card 58. Accordingly, in a step S81, the controller 70 receives the {Ks1}Kmc(1) and decrypts this {Ks1}Kmc(1) by using the private decryption key (Kmc(1)) unique to the memory card 58, accepting the symmetric key (Ks1) unique to the session. It is noted that the private decryption key (Kmc(1)) of the memory card 58 is also stored in the key memory 78 similarly to the certified public encryption key ({KPmc(1)}Kpma).

Next, the controller 70 generates a symmetric key (Ks2) unique to this session in a step S83, and decryptably encrypts and outputs the symmetric key (Ks2) unique to the session and the public encryption key (KPm(1)) by use of the symmetric key (Ks1) unique to the session. That is, {Ks2//KPm(1)}Ks1 is created and delivered to the controller 36 through the bus 34.

Note that the representation {X//Y} Z means information of X and Y respectively encrypted in a decryptable form by a key Z. This is true hereunder throughout the embodiment.

Then, the controller 36 adds the transaction ID to the {Ks2//KPm(1)}Ks1 in a step S85, and transmits {Ks2//KPm(1)}Ks1//transaction ID in a step S87.

It is noted that the representation X//Y means that X and Y are respectively transmitted and received. This is true hereunder throughout the embodiment.

The CPU 80a receives the {Ks2//KPm(1)}Ks1//transaction ID in a step S89, and decrypts the {Ks2//KPm(1)}Ks1 with the symmetric key (Ks1) unique to the session by use of the RAM 80b in a step S91. Thus, Ks2 and KPm(1) are obtained. Subsequently, the CPU 80a acquires a content decryption key (Kc) from a database stored on the HDD 84 according to the content ID acquired before (in the step S65) in a step S93 shown in FIG. 10. Then, the CPU 80a generates a management code (license ID) capable of specifying issuance of a license in a step S95.

Also, the CPU 80a produces limitation information (AC1) and control information (AC2) according to the AC obtained before (in the step S65) in a step S97. The limitation information (AC1) includes permission information for determining whether to output a content decryption key (Kc) stored in the memory card 58 and number-of-times limitation information for limiting the number of times of reproduction.

It is noted that the number-of-times limiting information is, for example, 2-bit data and set between "00"–"FF". The number-of times limiting information "00" represents prohibition from reproducing while "FF" shows the limitless number of times of reproducing. Also, the number of times of reproduction is limited in between "01"–"FE". More precisely, a number of times of outputting of the content decryption key (Kc) is limited.

Furthermore, the control information (AC2) is information representative of a limitation of reproduction, such as a time limit (term) of reproducing, on a side of a reproducer circuit. Specifically, the time limit of reproduction limits a reproducible day and time.

Then, the CPU 80a encrypts the content decryption key (Kc), limiting information (AC1), control information (AC2), a license ID and a content ID with use of the public encryption key (KPm(1)) decryptable by the decryption key (Km(1)) unique to the memory card 58 in a step S99. That is, {Kc//AC1//AC2//license ID//content ID}Km(1) is generated.

Subsequently, the CPU 80a encrypts the {Kc//AC1//AC2//license ID//content ID}Km(1) by use of the symmetric key (Ks2) unique to this session while the RAM 80b is also used in a step S101. That is, {Kc//AC1//AC2//license ID//content ID}Km(1)}Ks2 is produced. Then, this {{Kc//AC1//AC2//license ID//content ID}Km(1)}Ks2 is transmitted in a step S103.

Accordingly, the controller 36 receives the {{Kc//AC1//AC2//license ID//content ID}Km(1)}Ks2 in a step S105, and thereafter provides it to the controller 70. In response thereto, the controller 70 decrypts the {{Kc//AC1//AC2//license ID//content ID}Km(1)}Ks2 by the symmetric key (Ks2) in a step S107 shown in FIG. 11. Consequently, the {Kc//AC1//AC2//license ID//content ID}Km(1) is produced. Next, the controller 70 decrypts the {Kc//AC1//AC2//license ID//content ID}Km(1) into a plain text by use of the decryption key (Km(1)) unique to the memory card 58 in a step S109. Accordingly, this provides a content decryption key (Kc), limiting information (AC1), control information (AC2), and a license ID. Succeedingly, the controller 70 stores the content decryption key (Kc), the limiting information (AC1), the control information (AC2), the license ID and the content ID into the license memory 76 in a step S111.

When the content decryption key (Kc), the limiting information (AC1), the control information (AC2), the license ID and the content ID are stored in the license memory 76, the controller 36 transmits the transaction ID acquired before (in the step S79) and a data transmission request in a step S113. In response thereto, the CPU 80a acquires from the HDD 84 the music data, i.e., {Data}Kc obtained by decryptably encrypting the content data, by the content decryption key (Kc), and additional information (Data-inf) corresponding thereto. It is noted the additional information (Data-inf) includes plain text information such as corresponding content data related to copyright or related to server access, title name, song writer's words, jackets and etc. In a following step S117, the CPU 80a transmits {Data}Kc//Data-inf.

Accordingly, the controller 36 receives the {Data}Kc//Data-inf in a step S119, and thereafter provides it to the controller 70. The controller 70 accepts the {Data}Kc//Data-inf in a step S121 and stores encrypted content data {Data}Kc and additional information (Data-inf) in the memory 74.

Having stored the encrypted content data {Data}Kc and the additional information (Data-inf), the controller 36 transmits the transaction ID and data acceptance in a step S123, and thereafter disconnects the circuit. Accordingly, the CPU 80a receives the transaction ID and the data acceptance in a step S125, and then, the process is returned.

Thus, the encrypted content data (music data), additional information thereto and information (license information) required for reproducing, such as a decryption key are stored (downloaded) into the memory card 58 according to the reservation information. It is noted that after completion of the download, the reservation information corresponding to the content data is erased from the schedule memory 48.

According to this embodiment, only by making a reservation on the reservation screen, it is possible to download desired music data according to the time information and therefore, an operation is simple. Furthermore, in a case impossible to download the data, the time information is renewed so as to download the data again, and therefore, it is possible to surely perform the download. In addition, a setting of the reserved time to an office hour or a bedtime hour can avoid a state that it is impossible to perform a telephone conversation by the cellular phone 12.

Furthermore, the downloaded music data can be reproduced by utilizing the cellular phone 12. Accordingly, the reproduced music data is output via a headphone 24 connected to the output terminal 60. It is noted that a reproducing process is also described in detail in Japanese Patent Application No. 11-345229 previously filed by the applicant.

Figure 12:
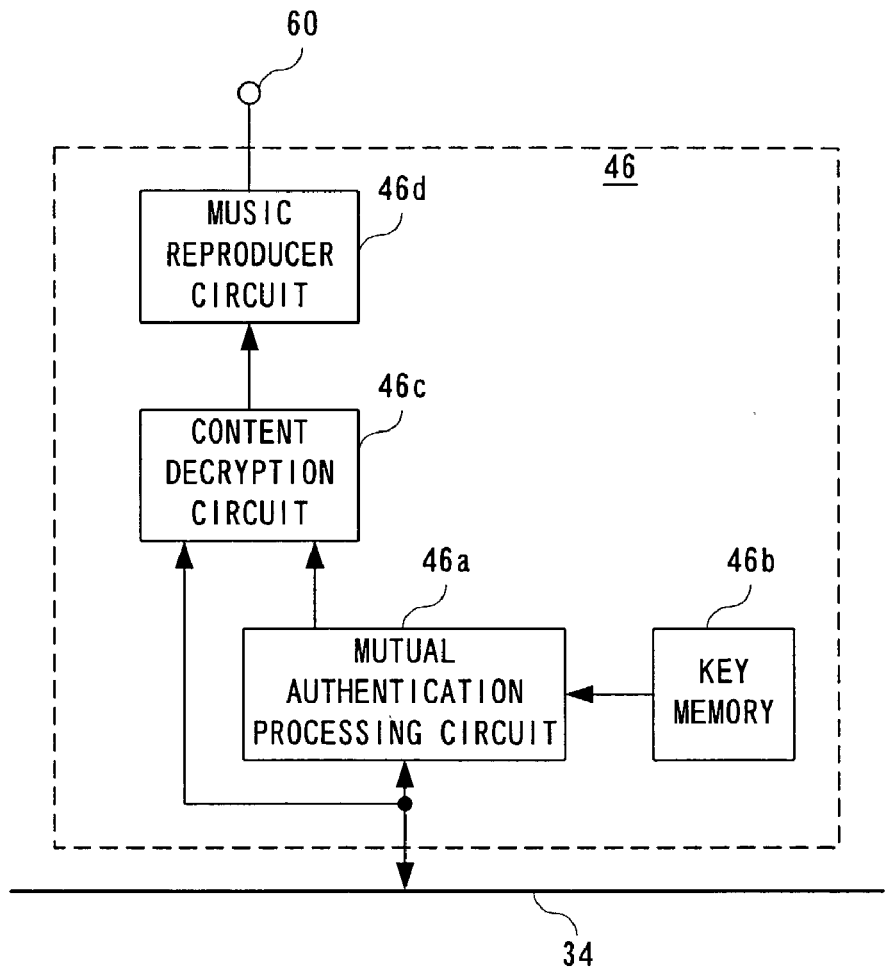
FIG. 12 is an illustrative view showing a configuration of a reproducer circuit of the cellular phone shown in FIG. 2.

The music-data reproducer circuit 46 includes a mutual authentication processing circuit 46a, as shown in FIG. 12. The mutual authentication processing circuit 46a is coupled to the memory card 58 through the bus 34, and interchanges keys with the memory card 58 to obtain a content decryption key (Kc) protected under the copyright and control information (AC2), thereby carrying out mutual authentication. Also, the mutual authentication processing circuit 46a is coupled with a key memory 46b and a content decryption processing circuit 46c. The key memory 46b stores a key unique to a class of the reproducer circuit 46 to be handled by the mutual authentication processing circuit 46a. The content decryption processing circuit 46c is also coupled to the memory card 58 through the bus 34 to be supplied with encrypted music data ({Data}Kc) from the memory card 58. Also, a content decryption key (Kc) finally obtained by the mutual authentication processing circuit 46a is supplied to the circuit 46c. Accordingly, in the content decryption processing circuit 46c the encrypted music data ({Data}Kc) is decrypted (converted into plain text) by use of the content decryption key (Kc). That is, music data (Data) as plain text information is output from the content decryption processing circuit 46c and supplied to a music reproducing processing circuit 46d. The music reproducing processing circuit 46d performs a reproducing process on the music data (Data), outputting to the terminal 60.

Figure 13:
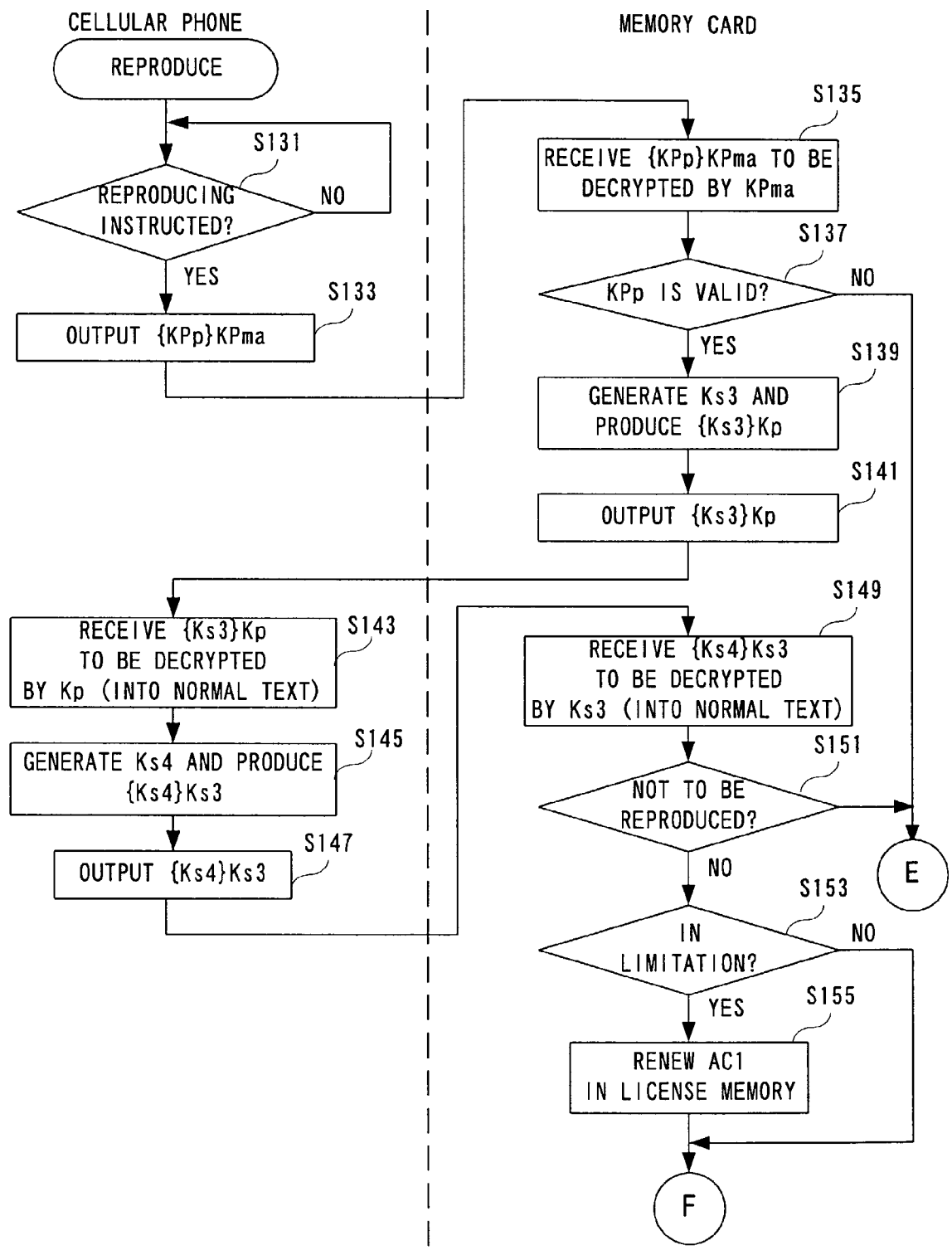
FIG. 13 is a flowchart showing a part of a reproducing process in a case of reproducing music data downloaded to the memory card by use of the cellular phone shown in FIG. 2.
Figure 14:
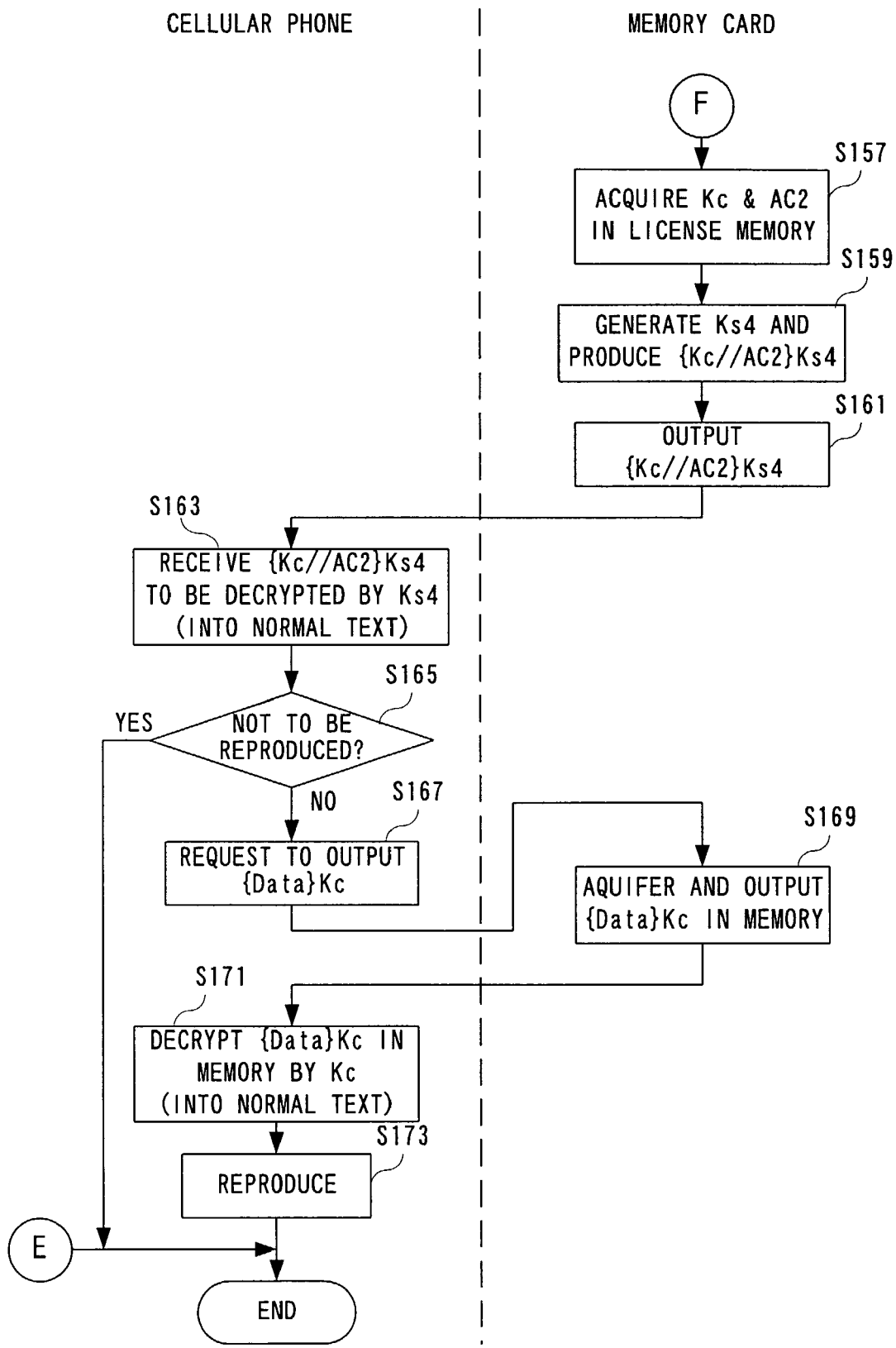
FIG. 14 is a flowchart showing another part of the reproducing process in a case of reproducing the music data downloaded to the memory card by use of the cellular phone shown in FIG. 2.

Specifically, a reproducing process is carried out according to flowcharts as shown in FIG. 13 and FIG. 14. It is noted that because the reproducing process is executed by the controller 36 and the reproducer circuit 46 within the cellular phone 12 and the controller 70 within the memory card 58, dot-lined partitioning is provided to facilitate understanding the processes of the cellular phone 12 and the memory card 58.

As shown in FIG. 13, first, the controller 36 determines whether or not a reproduce instruction is input by the user in a step S131. If "NO" in the step S131 i.e., if the reproduce instruction is not input, the process returns to the same step S131. On the other hand, if "YES" in the step S131 i.e., if the reproduce instruction is input, the reproduce instruction is input to the reproducer circuit 46 in a step S133. Consequently, the mutual authentication processing circuit 46a reads out a certified encrypted key ({KPp}KPma) stored in the key memory 46b and outputs it.

Accordingly, the controller 70 receives the certified encryption key ({KPp}KPma) and decrypts (converts into plain text) the certified encryption key ({KPp}KPma) by use of the authentication key (KPma) in a step S135. In a subsequent step S137, the controller 70 determines from a result of decryption in the step S135 whether or not the public encryption key (KPp) unique to a class of the reproducer circuit 46 is valid. If "NO" in the step S137 i.e., if the public encryption key (KPp) is invalid, the process is ended as it is as shown in FIG. 14. On the other hand, if "YES" in the step S137 i.e., if the public encryption key (KPp) is valid, the controller 70 generates a symmetric key (Ks3) unique to this session in a step S139 and encrypts it into a decryptable form by use of the private decryption key (Kp) which is asymmetry and pairs with the public encryption key (KPp) held in the key memory 46b. That is, {Ks3}Kp is produced. Then, the controller 70 outputs the {Ks3}Kp in a step S141.

Succeedingly, the controller 36 receives the {Ks3}Kp in a step S143 and inputs it to the mutual authentication processing circuit 46a. The mutual authentication processing circuit 46a decrypts (converts into plain text) the {Ks3}Kp by use of the private decryption key (Kp) stored in the key memory 46b. In a following step S145, a symmetric key (Ks4) unique to this session is generated, and the symmetric key (Ks4) is encrypted by the symmetric key (Ks3). That is, {Ks4}Ks3 is produced. Subsequently, this {Ks4}Ks3 is output to the memory card in a step S147.

In a step S149, the controller 70 receives the {Ks4}Ks3 and decrypts (converts) into plain text or normal text) the same by the symmetric key (Ks3). Thus, the symmetric key (Ks4) is obtained. In a following step S151, the controller 70 determines whether non-reproducible or not based on the limiting information (AC1). If "YES" in the step S151 i.e., if the output of the content decryption key (Kc) is not permitted or the output of the content decryption key (Kc) is permitted but the number-of-times limiting information is "00", determination is as non-reproducible and the process is ended as shown in FIG. 14. On the other hand, if "NO" in the step S151 i.e., if the content decryption key (Kc) output is permitted and the number-of-times limiting information is other than "00", determination is as reproducible and it is determined whether there is limitation in the number of times of reproduction in a step S153. If "NO" in the step S153 i.e., if the number-of-times limiting information is "FF", and thus determination is as not limited in the number of times of reproducing, the process directly proceeds to a step S157 shown in FIG. 14. On the other hand, if "YES" in the step S153 i.e., if the number-of-times limiting information is in between "01"-"FE", determination is as limited in the number of times of reproducing, the number-of-times limiting information within the license memory 76 is renewed (decremented) in a step S155 and then, the process proceeds to a step S157.

In the step S157 shown in FIG. 14, the controller 70 acquires the content decryption key (Kc) in the license memory 76 and the control information (AC2) for the reproducer circuit. In a succeeding step S159, the content decryption key (Kc) and the reproducer-circuit control information (AC2) are encrypted by the afore-acquired symmetric key (Ks4) unique to the session. Accordingly, {Kc//AC2}Ks4 is produced. Then, the controller 70 outputs this {Kc//AC2}Ks4 in a step S161.

Accordingly, in a step S163 the controller 36 acquires the {Kc//AC2}Ks4 and inputs it to the mutual authentication processing circuit 46a. Then, the mutual authentication processing circuit 46a decrypts (converts into plain text) the {Kc//AC2}Ks4 with use of the symmetric key (Ks4), according to an instruction by the controller 36. Subsequently, in a step S165 the controller 36 determines whether it is non-reproducible or not based on the control information (AC2). That is, it is determined whether or not a term (time limit) for reproducing by the reproducer circuit 46 expired with referring to the time information given from the timer 42. If "YES" in the step S165 i.e., if the reproducible term is over, the process is ended as it is. On the other hand, if "NO" in the step S165 i.e., if the reproducible term did not expire, the controller 36 requests the memory 58 to output the {Data}Kc in a step S167. In response, the controller 70 acquires the encrypted music data {Data}Kc within the memory 74 and then outputs it in a step S169.

In response thereto, the controller 36 inputs the {Data}Kc to the content decryption processing circuit 46c in a step S171. Accordingly, the content decryption processing circuit 46c decrypts (converts into plain text) the {Data}Kc by use of the content decryption key (Kc). The content decryption processing circuit 46c outputs the music data (Data) to the music-reproducing processing circuit 46d in a step S173. The music-reproducing processing circuit 46d reproduces the music data (Data), and the process is completed.

Thus, it is possible to download desired content data (music data) on the basis of the reservation information, and it is possible to reproduce the music data.

Figure 15:
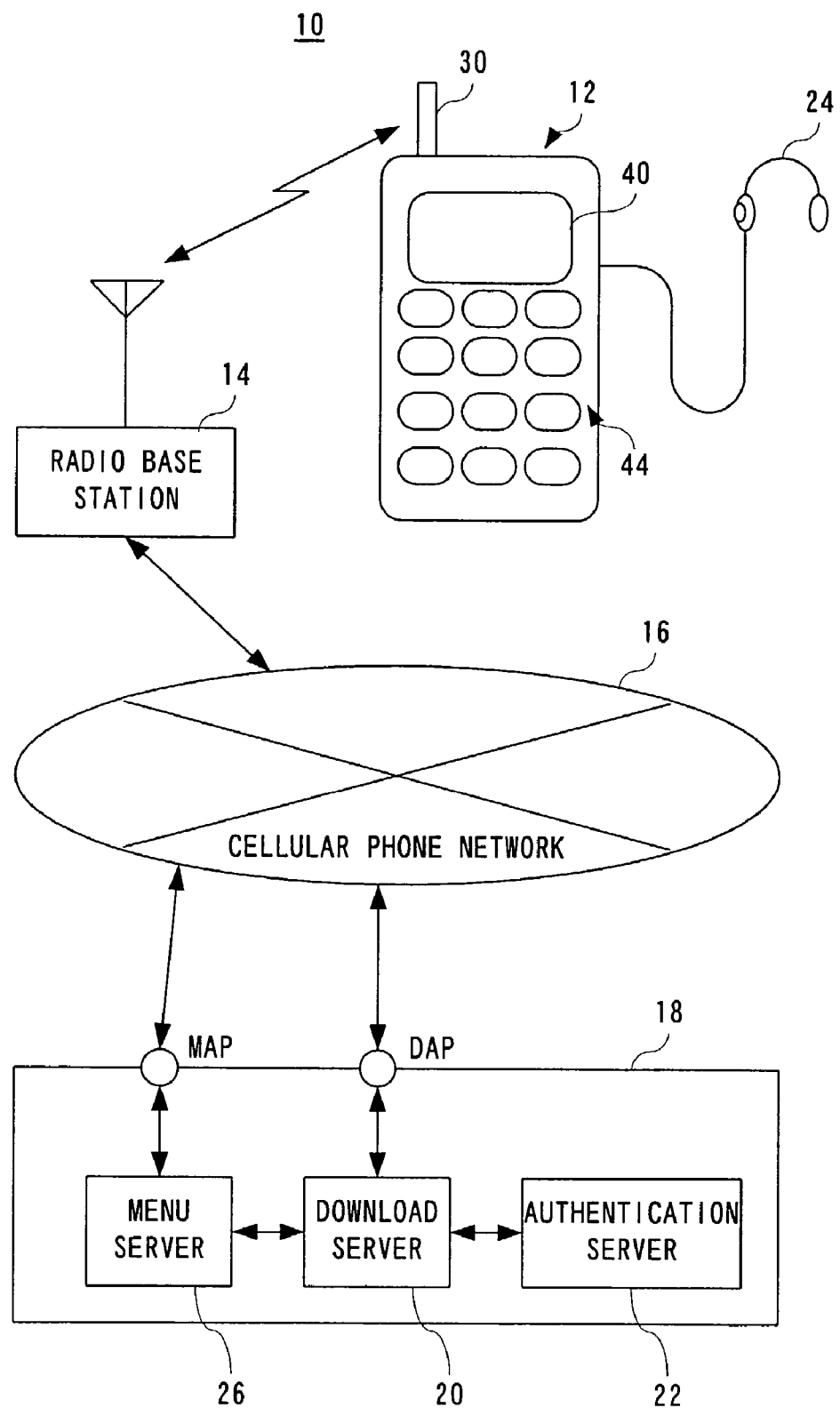
FIG. 15 is an illustrative view showing another embodiment of the present invention.

Since a download system 10 of another embodiment shown in FIG. 15 is the same as FIG. 1 embodiment except for that a menu server 26 is further provided with the delivery server 18 and the reservation information corresponding to the content data registered in the menu server 26 is downloaded so as to input the reservation information, a duplicate description is omitted.

Figure 16:
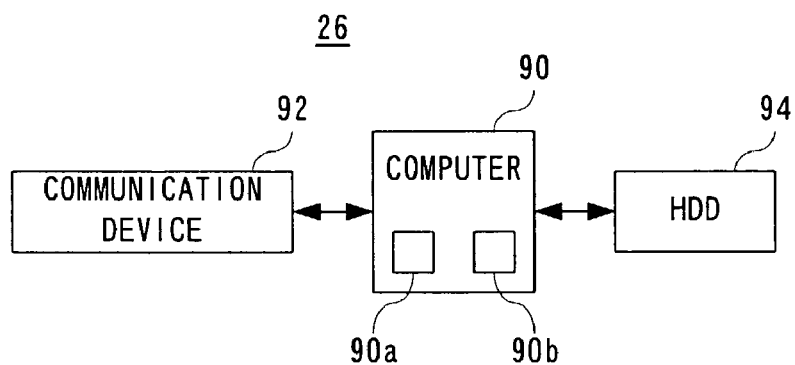
FIG. 16 is an illustrative view showing a configuration of a menu server of FIG. 15 embodiment.

As shown in FIG. 15, the menu server 26 is communicatively provided with the download server 20, and can communicate with the cellular phone 12 via the cellular phone network 16 and the radio base station 14. The menu server 26 includes a computer 90 such as a personal computer (PC) and etc. as shown in FIG. 16, and the computer 90 is connected with a communication circuit 92 and an HDD 94. The HDD 94 is stored with a plurality of reservation information corresponding to a plurality of content data (music data) and can transmit a list of the corresponding reservation information to a side of the cellular hone 12 according to an instruction from the cellular phone 12.

The user selects desired reservation information from the list of the reservation information displayed on the display 40 of the cellular phone 12, and in response thereto, the menu server 26 transmits selected one reservation information to the cellular phone 12. Accordingly, the cellular phone 12 registers (stores) the transmitted reservation information into the schedule memory 48.

Thereafter, the cellular phone 12 downloads the content data (music data) from the download server 20 on the basis of the reservation information registered in the schedule memory 48.

Figure 17:
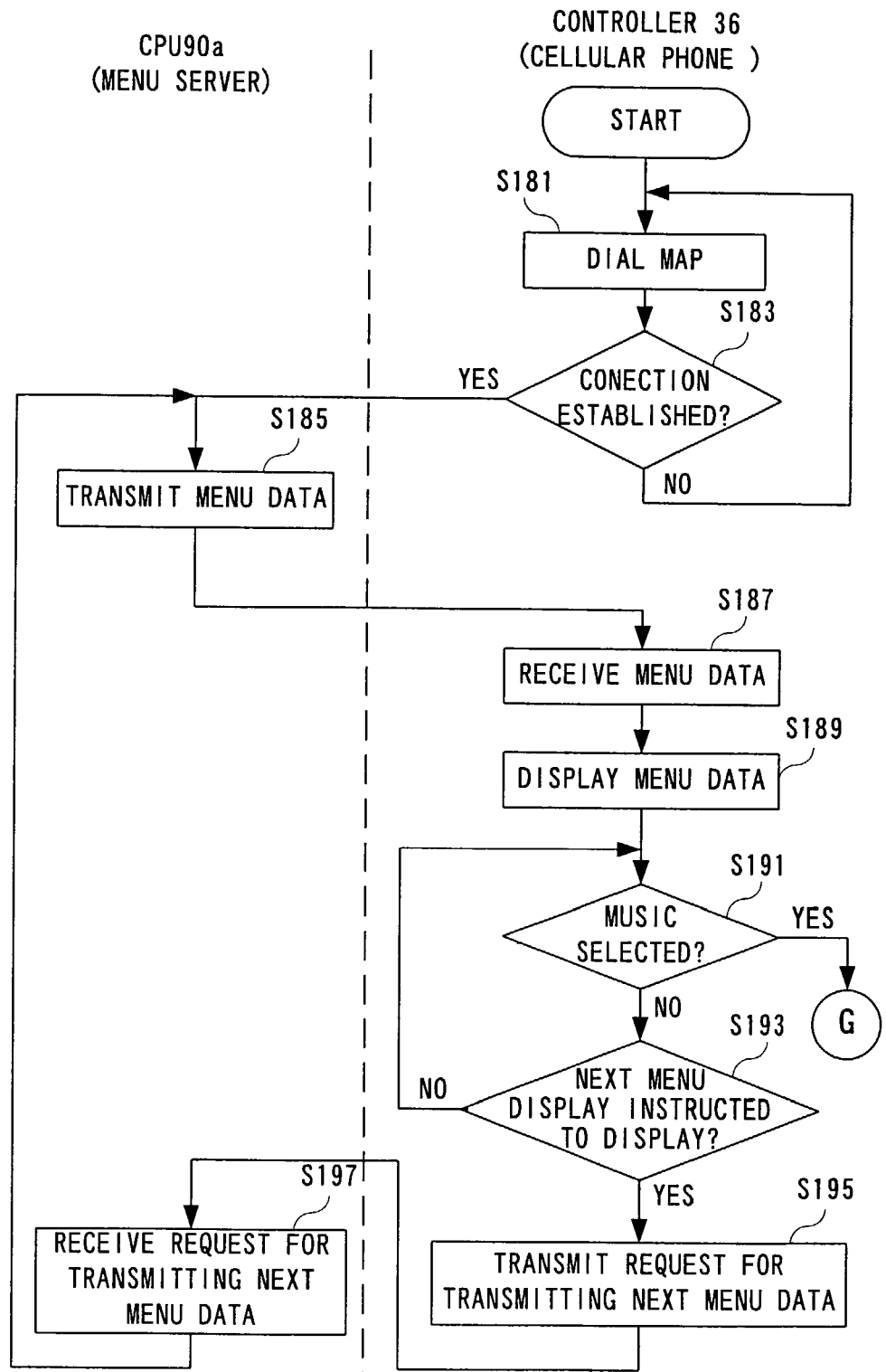
FIG. 17 is a flowchart showing a part of a process of a controller 36 and a CPU 90a in a case that reservation information is downloaded from a menu server of FIG. 15 embodiment and a reservation of downloading music data is made by use of a cellular phone.
Figure 18:
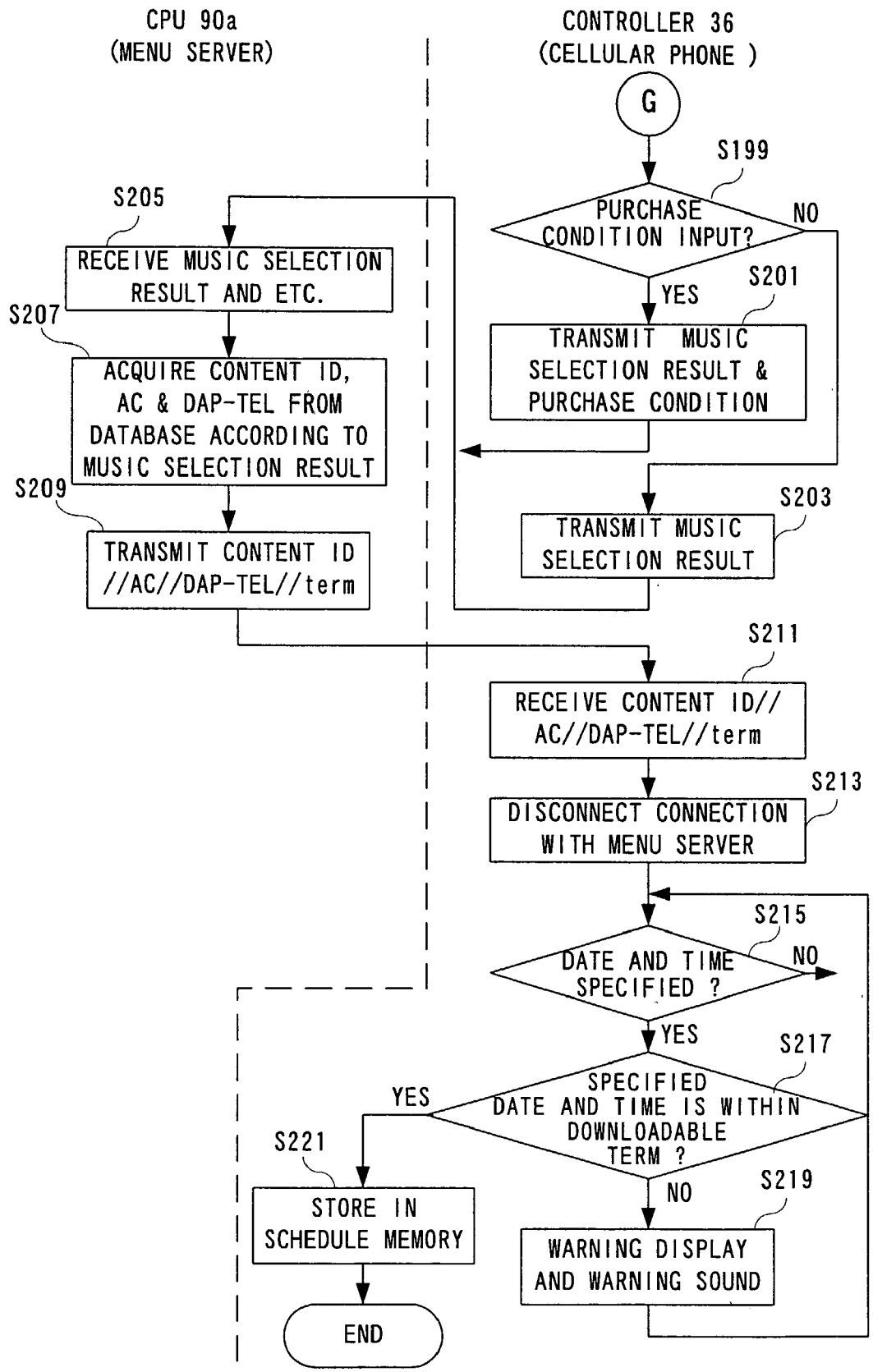
FIG. 18 is a flowchart showing another part of the process of the controller 36 and a CPU 90a in a case that reservation information is downloaded from the menu server of FIG. 15 embodiment and the reservation of downloading music data is made by use of a cellular phone.

More specifically, the controller 36 provided on the cellular phone 12 and a CPU 90a provided on the menu server 26 are communicated with each other via the cellular phone network 16 and the radio base station 14. The reservation is made by obtaining the information required for the download of the content data (music data). The reservation process is shown in FIG. 17 and FIG. 18. It is noted that dot-lined partitioning is provided in order to facilitate understanding the processing of the controller 36 and the CPU 90a.

Referring to FIG. 17, when the reservation process is started, the controller 36 first dials connection information (MAP-TEL) to an access point (MAP) of the menu server 26 in a step S181. In a following step S183, the controller 36 determines whether or not a connection is established. If "NO" in the step S183 i.e., if the connection is not established, the process returns to the step S181 so as to perform re-dial again. On the other hand, if "YES" is determined in the step S183 i.e., if the connection is established, the CPU 90a transmits menu data in a step S185. For example, the menu data is a list of data researchable on a singer-by-singer or title-by-title basis such as a book utilized for selecting music of karaoke.

Accordingly, the controller 36 receives the menu data in a step S187, and displays it on the display 40 by controlling the driver 38 in a step 189. That is, the display 40 is displayed with a list in the order of the 50-character kana (in Japanese language) syllabary on a singer-by-singer or title-by-title basis. It is noted that because the menu data is enormous in amount, the data is transmitted by a predetermined amount at one time and displayed on the display 40 in this embodiment. Succeedingly, the controller 36 determined whether or not music is selected in a step S191. That is, it is determined whether or not a determination button (not shown) provided on the operation panel 44 is depressed. If "YES" is determined in the step S191 i.e., if the determination button is depressed, the process proceeds to a step S199 shown in FIG. 18.

On the other hand, if "NO" in the step S191 i.e., if the determination button is not depressed, the controller 36 determines whether or not an instruction of displaying the next menu data is present in a step S193. That is, it is determined whether or not a next page button (not shown) provided on the operation panel 44 is depressed. If "NO" in the step S193 i.e., if the next page button is not depressed, the process returns to the step S191 as it is. On the other hand, if "YES" in the step S193 i.e., if the next page button is depressed, a transmission request of next menu data is transmitted in a step S195. Consequently, the CPU 90a receives the transmission request of the menu data in a step S197, and in response thereto, the process returns to the step S185 so as to execute the transmission of the next menu data.

In a step S199 shown in FIG. 18, the controller 36 determines whether or not input of a purchase condition is present. That is, it is determined whether or not a reproduction condition (a number of times of reproductions, and etc.) is input. If "YES" in the step S199 i.e., if the reproduction condition is input, the controller 36 transmits a music selection result and the purchase condition in a step S201. On the other hand, if "NO" is determined in the step S199 i.e., if the reproduction condition is not input, the controller 36 transmits only the music selection result in a step S203.

Consequently, in a step S205, the CPU 90a receives the music selection result and etc. (both of the music selection result and the purchase condition or only the music selection), and stores it in a RAM 90b. In a following step S207, according to the music selection result, the CPU 90a acquires from the HDD 94 a content ID, AC, and connection information (DAP-TEL) to an access point (DAP) of the download server 20, and transmits the content ID, the AC, the connection information (DAP-TEL) to the access point (DAP) of the download server 20 and a downloadable term in a step S209. That is, content ID//AC//DAP-TEL//term is transmitted.

It is noted that the representation X//Y means transmission and reception of X and Y as shown in the above-described embodiment. This is true hereinafter throughout the present embodiment.

In a following step S211, the controller 36 receives the content ID//AC//DAP-TEL// term, and stores it in the RAM 62 and then, disconnects the connection with the menu server 26 in a step S213.

Then, the CPU 36 determines whether or not a date and time of the download is specified in a step S215. If "NO" in the step S215, it is determined that the date and time is not specified, and then, the process directly returns to the step S215. On the other hand, if "YES" in the step S215 i.e., if the date and time is specified, it is determined whether or not the specified date and time is within the downloadable term. If "NO" in a step S217 i.e., if the specified date and time is not within the downloadable term, a warning message and warning sound are output in a step S219, and then, the process returns to the step S215. For example, a message such as "SPECIFIED DATE AND TIME ARE NOT APPROPRIATE", "INPUT AGAIN" and etc. is displayed on the display 40 by controlling the driver 38, and the warning sound such as "PEE" and etc. is output from the speaker 54 by controlling the sound processing circuit 50.

On the other hand, if "YES" in the step S217 i.e., if the specified date and time is within the downloadable term, content ID, AC, telephone number (DAP-TEL) and specified date and time i.e., reservation information within the RAM 62 are stored in the schedule memory 48 in a step S221, and then, the process is ended.

It is noted that although a size of the content data (music data) is not shown at all, it may be transmitted together with the content ID and etc. from the menu server in this embodiment.

According to this embodiment, since the reservation information relating to the download can be acquired from the menu server 26, there is no need to obtain the reservation information form a magazine and etc. and input them one by one. That is, it is possible to further simplify the operation.

It is noted that although a description is made in these embodiments on only a case of one reservation per day, a case of more than two reservations per day may be appropriate. In this case, when storing the reserved time in the memory 36a, there is a need to store it relating with the reservation information.

Also in this embodiment, although only the music data is shown as content data, it is needless to say that content data such as image data and etc. protected under copyright is also appropriate. However, in a case of the image data, input of a reproduction instruction after the download displays an image corresponding to the image data on a display of the cellular phone.

Furthermore, in this embodiment, in a case that data is encrypted or decrypted in each of the memory card, the download server and the menu server, a corresponding controller or CPU executes the process. Alternatively an exclusive circuit may be provided because the processing of encryption and decryption is enormous.

In addition, although the cellular phone is utilized as a data delivery terminal in this embodiment, an exclusive machine for download and reproduction having no communication function with another cellular phone may be appropriate.

Alternatively, a PHS capable of being connected to a delivery server via a radio base station and a simple cellular phone network may be appropriate for download.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reservation delivery system, comprising:
   a terminal for receiving downloaded content data via a cellular phone network;
   a menu server being coupled to said terminal via said cellular phone network; and
   a download server coupled to said terminal via said cellular phone network, wherein
   said menu server includes
   a first holding means for holding a plurality of data identifying information each corresponding to each of a plurality of content data;
   a second holding means for holding connection information to said download server which delivers the content data, the connection information corresponding to the data identifying information;
   an input information receiving means for receiving input information input into said terminal;
   an identifying information selecting means for selecting one data identifying information according to the input information received by said input information receiving means;
   a reservation information creating means for creating reservation information including the one data identifying information selected by said identifying information selecting means and connection information corresponding to the one data identifying information; and
   a reservation information transmitting means for transmitting the created reservation information to said terminal, and
   said terminal includes
   a transmitting/receiving means for transmitting and receiving data via the cellular phone network;
   a first input means for inputting the input information;
   an input information transmitting means for transmitting the input information to said menu server via said transmitting/receiving means;
   a reservation information receiving means for receiving the reservation information via said transmitting/receiving means;
   a second input means for inputting schedule information including a date and time of download in correspondence to the reservation information received by said reservation information receiving means;

an information storage memory for storing the reservation information and the schedule information;

an establishing means for automatically establishing a connection to said download server according to the schedule information and the reservation information;

a download means for downloading the content data corresponding to the data identifying information from said download server according to the reservation information; and a second storage memory for storing downloaded content data, and said download server includes a third holding means for storing at least the content data; and a content data transmitting means for transmitting the content data corresponding to the data identifying information in response to a request from said terminal.

2. A reservation delivery system according to claim 1, wherein the reservation information further includes a downloadable term of the content data and said second input means includes a forcing means for forcing the date and time of download to be input within the downloadable term.

3. A terminal, having a transmitter/receiver, for receiving content data downloaded from a delivery source via a cellular telephone network, comprising:

a first storage memory in said terminal for storing reservation information and schedule information input thereto, wherein said reservation information includes at least data identifying information of the content data, and wherein said schedule information includes a date and time of download, in correspondence to the reservation information;

an establishing means for automatically establishing connection with the delivery source which delivers the content data according to the schedule information and the reservation information;

a download means for downloading the content data corresponding to the data identifying information from the delivery source via said transmitter/receiver according to the reservation information; and a second storage memory for storing downloaded content data.

4. The terminal of claim 3, further comprising a determination means for determining whether there is a situation possible to download the content data or a situation impossible to download the content data on the basis of a download environment including a radio field intensity at at least said transmitter/receiver when the connection is established by said establishing means, and further wherein said download means conducts the downloading of the content data only in a case that said determination means determines that there exists a situation possible to download the content data.

5. The terminal of claim 4, further comprising an optimizing means for optimizing the download environment so as to become a situation possible downloadable condition in a case that said determination means initially determines that there exists a situation impossible to download the content data.

6. A terminal according to claim 5, wherein the download environment further includes a vacant capacity of said second storage memory.

7. A terminal according to claim 5, further comprising a warning means for warning a not-downloadable situation in a case that the situation impossible to perform the download is determined by said determination means and the download environment is not optimized to the situation possible to perform the download by said optimizing means.

8. A terminal according to claim 5, further comprising a renewal means for renewing the date and time of the download in a case that the situation impossible to perform the download is determined by said determination means and the download environment is not optimized to the situation possible to perform the download by said optimizing means.

9. A terminal according to claim 5, wherein the reservation information further includes a downloadable term of the content data, a first input means, for inputting reservation information into said first storage memory includes a reservation information obtaining means for obtaining the reservation information from said delivery source via said transmitter/receiver, and a second input means, for inputting schedule information into said first storage memory, includes a forcing means for forcing the date and time of download to be input within the downloadable term.

10. A terminal according to claim 5, further comprising a battery for providing an electric power source in the terminal itself, wherein the download environment further includes a remaining amount of power in said battery.

11. A terminal according to claim 5, wherein said second storage memory includes an attachable/detachable memory card, said download means downloads license data including encrypted content data and a decryption key for decrypting the encrypted content data, said memory card includes a first card memory for storing the encrypted content data, a second card memory for storing the decryption key, a second decryption means for decrypting cipher performed on the license data so as to write to said second card memory, and an encryption means for encrypting the license data read from said second card memory.

12. A terminal, having a transmitter/receiver, for receiving content data downloaded from a delivery source via a cellular telephone network and storing the content data in an attachable/detachable storing device, comprising:

an interface for transmitting and receiving at least the content data with the storing device, when the storing device is attached;

a storage memory in said terminal for storing reservation information and schedule information input thereto, wherein said reservation information includes at least data identifying information of the content data, and wherein said schedule information includes a date and time of download, in correspondence to the reservation information;

an establishing means for automatically establishing connection with the delivery source which delivers the content data according to the schedule information and the reservation information;

a download means for downloading the content data corresponding to the data identifying information from the delivery source via said transmitter/receiver according to the reservation information; and a storage controller for storing downloaded content data in the attachable/detachable storing device via said interface.

13. The terminal of claim 12, further comprising a determination means for determining whether there is a situation possible to download the content data or a situation impossible to download the content data on the basis of a download environment including a radio field intensity at at least said transmitter/receiver when the connection is established by said establishing means, and further wherein said download means conducts the downloading of the content data only in a case that said determination means determines that there exists a situation possible to download the content data.

14. The terminal of claim 13, further comprising an optimizing means for optimizing the download environment so as to become a situation possible downloadable condition in a case that said determination means initially determines that there exists a situation impossible to download the content data.

15. A terminal according to claim 14, wherein the download environment further includes a vacant capacity of said attachable/detachable storing device.

16. A terminal according to claim 14, further comprising a renewal means for renewing the date and time of the download in a case that the situation impossible to perform the download is determined by said determination means and the download environment is not optimized to the situation possible to perform the download by said optimizing means.

17. A terminal according to claim 14, further comprising a warning means for warning a not-downloadable situation in a case that that the situation impossible to perform the download is determined by said determination means and the download environment is not optimized to the situation possible to perform the download by said optimizing means.

18. A terminal according to claim 14, wherein the reservation information further includes a downloadable term of the content data, a first input means, for inputting reservation information into said storage memory, includes a reservation information obtaining means for obtaining the reservation information from said delivery source via said transmitter/receiver, and a second input means, for inputting schedule information into said storage memory, includes a forcing means for forcing the date and time of download to be input within the downloadable term.

19. A terminal according to claim 14, further comprising a battery for providing an electric power source in the terminal itself, and wherein the download environment further includes a remaining amount of power in said battery.

* * * * *